US007254386B2

(12) United States Patent
Rajaram

(10) Patent No.: US 7,254,386 B2
(45) Date of Patent: Aug. 7, 2007

(54) SYSTEM AND METHOD FOR IMPROVED SECURITY IN HANDSET REPROVISIONING AND REPROGRAMMING

(75) Inventor: Gowri Rajaram, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 804 days.

(21) Appl. No.: 10/206,780

(22) Filed: Jul. 25, 2002

(65) Prior Publication Data

US 2003/0033525 A1    Feb. 13, 2003

Related U.S. Application Data

(63) Continuation-in-part of application No. 09/927,131, filed on Aug. 10, 2001.

(51) Int. Cl.
*H04M 3/00*    (2006.01)

(52) U.S. Cl. .............. 455/418; 455/3.03; 455/406; 455/419; 455/420; 455/550.1; 380/249; 717/168; 717/173

(58) Field of Classification Search ............ 455/3.03, 455/406–411, 418, 419, 420, 550.1; 380/249, 380/273; 717/168–173; 726/3
See application file for complete search history.

(56) References Cited

U.S. PATENT DOCUMENTS

| 5,046,082 | A | | 9/1991 | Zicker et al. |
| 5,337,255 | A | | 8/1994 | Seidel et al. |
| 5,400,389 | A | | 3/1995 | Niiyama et al. |
| 5,481,706 | A | | 1/1996 | Peek |
| 5,507,009 | A | | 4/1996 | Grube et al. |
| 5,600,823 | A | | 2/1997 | Sherer et al. |
| 5,673,317 | A | * | 9/1997 | Cooper ............... 380/249 |
| 5,699,275 | A | | 12/1997 | Beasley et al. |
| 5,715,462 | A | | 2/1998 | Iwamoto et al. |
| 5,734,904 | A | | 3/1998 | Kanamori et al. |
| 5,771,386 | A | | 6/1998 | Baumbauer |
| 5,784,537 | A | | 7/1998 | Suzuki et al. |
| 5,790,704 | A | | 8/1998 | Rao et al. |

(Continued)

FOREIGN PATENT DOCUMENTS

DE    19502728    8/1996

(Continued)

OTHER PUBLICATIONS

Guiagoussou et al., "Implementation of a Diagnostic and Troubleshooting Multi-Agent System for Cellular Networks", Int'l J Network Mgmnt., pp. 221-237, Aug. 1999.

(Continued)

*Primary Examiner*—Steve M. D'Agosta

(57) ABSTRACT

Systems and methods for improved security in handset reprogramming are provided that prevent a handset from being reprogrammed in the field without authorization from carrier. When a handset receives a reprogramming request, or detects a reprogramming attempt, the handset contacts the carrier for authorization to be reprogrammed. The network can provide the authorization, deny the authorization, require additional information from the reprogramming device, or contact the reprogramming device directly to authorize the reprogramming. Additionally, the carrier may provide the handset and the reprogramming device each with a private key that can be converted by each device and then compared by the handset to determine if the reprogramming device is authorized.

19 Claims, 19 Drawing Sheets

U.S. PATENT DOCUMENTS

| | | | |
|---|---|---|---|
| 5,790,856 A | 8/1998 | Lillich | |
| 5,832,086 A | 11/1998 | Rosauer | |
| 5,835,778 A | 11/1998 | Yoshihara | |
| 5,875,242 A | 2/1999 | Glaser et al. | |
| 5,920,826 A | 7/1999 | Metso et al. | |
| 5,930,704 A * | 7/1999 | Kay | 455/419 |
| 5,938,766 A | 8/1999 | Anderson et al. | |
| 5,960,356 A | 9/1999 | Alperovich et al. | |
| 5,974,312 A | 10/1999 | Hayes et al. | |
| 6,018,543 A | 1/2000 | Blois et al. | |
| 6,023,620 A * | 2/2000 | Hansson | 455/419 |
| 6,026,400 A | 2/2000 | Suzuki | |
| 6,047,071 A * | 4/2000 | Shah | 380/273 |
| 6,138,009 A * | 10/2000 | Birgerson | 455/419 |
| 6,138,153 A | 10/2000 | Collins et al. | |
| 6,145,098 A | 11/2000 | Nouri et al. | |
| 6,195,546 B1 | 2/2001 | Leung et al. | |
| 6,247,065 B1 | 6/2001 | Greenspan et al. | |
| 6,272,333 B1 | 8/2001 | Smith | |
| 6,275,694 B1 | 8/2001 | Yoshida et al. | |
| 6,308,061 B1 * | 10/2001 | Criss et al. | 455/418 |
| 6,351,636 B2 | 2/2002 | Shaffer et al. | |
| 6,415,266 B1 | 7/2002 | Do | |
| 6,442,660 B1 | 8/2002 | Heneriau et al. | |
| 6,449,476 B1 | 9/2002 | Hutchison, IV et al. | |
| 6,457,174 B1 | 9/2002 | Kuroda et al. | |
| 6,460,070 B1 | 10/2002 | Turek et al. | |
| 6,470,447 B1 | 10/2002 | Lambert et al. | |
| 6,493,549 B1 | 12/2002 | Axelson et al. | |
| 6,493,871 B1 | 12/2002 | McGuire et al. | |
| 6,498,789 B1 | 12/2002 | Honda | |
| 6,546,492 B1 * | 4/2003 | Walker et al. | 726/3 |
| 6,549,770 B1 | 4/2003 | Marran | |
| 6,578,056 B1 | 6/2003 | Lamburt | |
| 6,578,142 B1 | 6/2003 | Anderson et al. | |
| 6,622,017 B1 * | 9/2003 | Hoffman | 455/419 |
| 6,633,759 B1 | 10/2003 | Kobayashi | |
| 6,643,506 B1 | 11/2003 | Criss et al. | |
| 6,714,992 B1 | 3/2004 | Kanojia et al. | |
| 6,731,946 B1 | 5/2004 | Stanwood et al. | |
| 6,754,894 B1 | 6/2004 | Costello et al. | |
| 6,754,895 B1 | 6/2004 | Bartel et al. | |
| 6,763,252 B2 | 7/2004 | Itazawa | |
| 6,785,541 B2 | 8/2004 | Martin | |
| 6,950,847 B2 | 9/2005 | Harrisville-Wolff et al. | |
| 6,959,192 B1 | 10/2005 | Cannon et al. | |
| 6,990,660 B2 | 1/2006 | Moshir et al. | |
| 7,065,347 B1 | 6/2006 | Vikse et al. | |
| 2001/0000538 A1 | 4/2001 | Kowaguchi | |
| 2001/0005861 A1 | 6/2001 | Mousseau et al. | |
| 2001/0019953 A1 | 9/2001 | Furukawa et al. | |
| 2001/0027500 A1 | 10/2001 | Matsunaga | |
| 2001/0051519 A1 | 12/2001 | Shirai | |
| 2001/0054161 A1 | 12/2001 | Wooddruff | |
| 2002/0019973 A1 | 2/2002 | Hayashida | |
| 2002/0026634 A1 * | 2/2002 | Shaw | 717/173 |
| 2002/0065041 A1 | 5/2002 | Lunsford et al. | |
| 2002/0072359 A1 | 6/2002 | Moles et al. | |
| 2002/0077077 A1 | 6/2002 | Rezvani et al. | |
| 2002/0083142 A1 | 6/2002 | Lagosanto et al. | |
| 2002/0083143 A1 | 6/2002 | Cheng | |
| 2002/0131397 A1 | 9/2002 | Patel et al. | |
| 2002/0142762 A1 | 10/2002 | Chmaytelli et al. | |
| 2002/0152268 A1 | 10/2002 | Kureshy et al. | |
| 2002/0160763 A1 | 10/2002 | Mittal et al. | |
| 2002/0161796 A1 | 10/2002 | Sylthe | |
| 2002/0170039 A1 | 11/2002 | Kovacevic | |
| 2003/0014561 A1 | 1/2003 | Cooper | |
| 2003/0060189 A1 | 3/2003 | Minear et al. | |
| 2003/0195013 A1 | 10/2003 | Zicker et al. | |
| 2004/0158829 A1 | 8/2004 | Beresin et al. | |
| 2004/0177072 A1 | 9/2004 | Salminen et al. | |
| 2004/0203768 A1 | 10/2004 | Ylitalo et al. | |
| 2004/0214551 A1 | 10/2004 | Kim | |
| 2004/0229644 A1 | 11/2004 | Heie et al. | |
| 2004/0240657 A1 | 12/2004 | Camarillo | |
| 2004/0249657 A1 | 12/2004 | Kol et al. | |
| 2004/0249768 A1 | 12/2004 | Kontio et al. | |
| 2004/0266422 A1 | 12/2004 | Hotze et al. | |
| 2005/0064847 A1 | 3/2005 | Kirbas et al. | |
| 2005/0079863 A1 | 4/2005 | Macaluso | |
| 2005/0209930 A1 | 9/2005 | Coppinger et al. | |

FOREIGN PATENT DOCUMENTS

| | | |
|---|---|---|
| DE | 19543843 | 5/1997 |
| DE | 19850133 | 5/1999 |
| EP | 0459344 | 12/1991 |
| EP | 0889405 | 1/1999 |
| EP | 0918420 | 5/1999 |
| EP | 1014263 | 6/2000 |
| FR | 2800963 | 5/2001 |
| GB | 2227584 | 8/1990 |
| GB | 2349485 | 11/2000 |
| WO | WO 9300633 | 1/1993 |
| WO | WO 98/09208 | 3/1998 |
| WO | WO 9922325 | 5/1999 |
| WO | WO 0067112 | 11/2000 |
| WO | WO 0073912 | 12/2000 |
| WO | WO 0074412 | 12/2000 |
| WO | WO 0135686 | 5/2001 |
| WO | WO 02058364 | 7/2002 |

OTHER PUBLICATIONS

International Search Report (ISR): PCT/ISA/210 for International Application No. PCT/IB02/02906, ISR dated Feb. 14, 2003, 3 pages.

* cited by examiner

SYSTEM AND METHOD FOR IMPROVED SECURITY IN HANDSET REPROVISIONING AND REPROGRAMMING

RELATED APPLICATION

The present application is a continuation-in-part of co-pending U.S. patent application Ser. No. 09/927,131 entitled SYSTEM AND METHOD FOR EXECUTING WIRELESS COMMUNICATIONS DEVICE DYNAMIC INSTRUCTION SETS, of concurrent ownership, filed on Aug. 10, 2001, and related to co-pending United States patent application entitled SYSTEM AND METHOD FOR BI-DIRECTIONAL COMMUNICATION AND EXECUTION OF DYNAMIC INSTRUCTION SETS, of concurrent ownership, filed on Jul. 25, 2002, and related to co-pending United States patent application entitled SYSTEM AND METHOD FOR PEER-TO-PEER HANDSET COMMUNICATION, of concurrent ownership, filed on Jul. 25, 2002, each of which is incorporated herein by reference in its entirety.

BACKGROUND

1. Field of the Invention

The present invention generally relates to the field of wireless communications and more particularly relates to security systems for reprovisioning and reprogramming a wireless communication device.

2. Related Art

Wireless communication devices, which include any type of device that communication over a wireless communication network, are programmed and provisioned when they are manufactured. Alternatively, they may be programmed and provisioned when they are activated by a retailer or network access provider such as Sprint, Verizon, AT&T Mobile, and others. The programming and provisioning (referred to herein collectively as "programming") of a wireless communication device (also referred to herein as a "wireless device" "handset" or "mobile device") provides the handset with its mobile identification number ("MIN")—also called its telephone number, and other operating parameters, network parameters, and application software. These items are placed in persistent memory on the handset where they cannot be modified or deleted.

Typically, handsets are programmed by the carrier or service provider when the handset is activated. In conventional handsets, after this programming takes place, a lock code (also referred to herein as an "access code") is also placed in persistent memory on the handset. Thereafter, any future programming attempts must first provide the access code before the handset will allow its persistent memory to be modified, a process that known as reprovisioning or reprogramming (referred to herein collectively as "reprogramming").

This type of conventional security for reprogramming handsets faces many challenges. Application utilities and tools have been developed by grey market and black market interests that are able to reveal the access code of a handset so that the handset can then be reprogrammed. Often times, reprogrammed phones are then sold as grey market goods to unsuspecting consumers. Additionally, these illicitly reprogrammed phones are also sold on the black market, where their use confounds legal customers by jamming the network with unpaid for traffic.

Therefore, what is needed is a system and method that provides additional security in handsets against unauthorized reprogramming without hindering authorized reprogramming.

SUMMARY

Conventional handsets can currently be reprogrammed in the field with fairly inexpensive software utilities and a serial connection. Such reprogramming allows these handsets to be sold into the grey or black market where their illicit use jams the airwaves with additional traffic and confounds network access for paying customers.

Systems and methods for improved security in handset reprogramming are provided that prevent a handset from being reprogrammed in the field without some type of authorization from the service provider (also referred to herein as the "carrier"). A significant advantage of this novel solution is that the carrier can keep records relating to when, where, and by whom their phones that are deployed in the market are reprogrammed. Additionally, requiring carrier authorization for reprogramming a handset significantly increases the difficulty and complexity of reprogramming handsets for distribution into the grey or black markets.

When a handset receives a reprogramming request, or detects a reprogramming attempt, the handset contacts the carrier for authorization to be reprogrammed. The network can provide the authorization, deny the authorization, require additional information from the reprogramming device, or contact the reprogramming device directly to authorize the reprogramming.

Advantageously, handset may be manufactured without the access code stored in persistent memory. This lack of an access code provides the handset with no ability to be reprogrammed without carrier knowledge and authorization. Additional advantages and applications of the systems and methods presented herein will become apparent after review of the detailed description.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
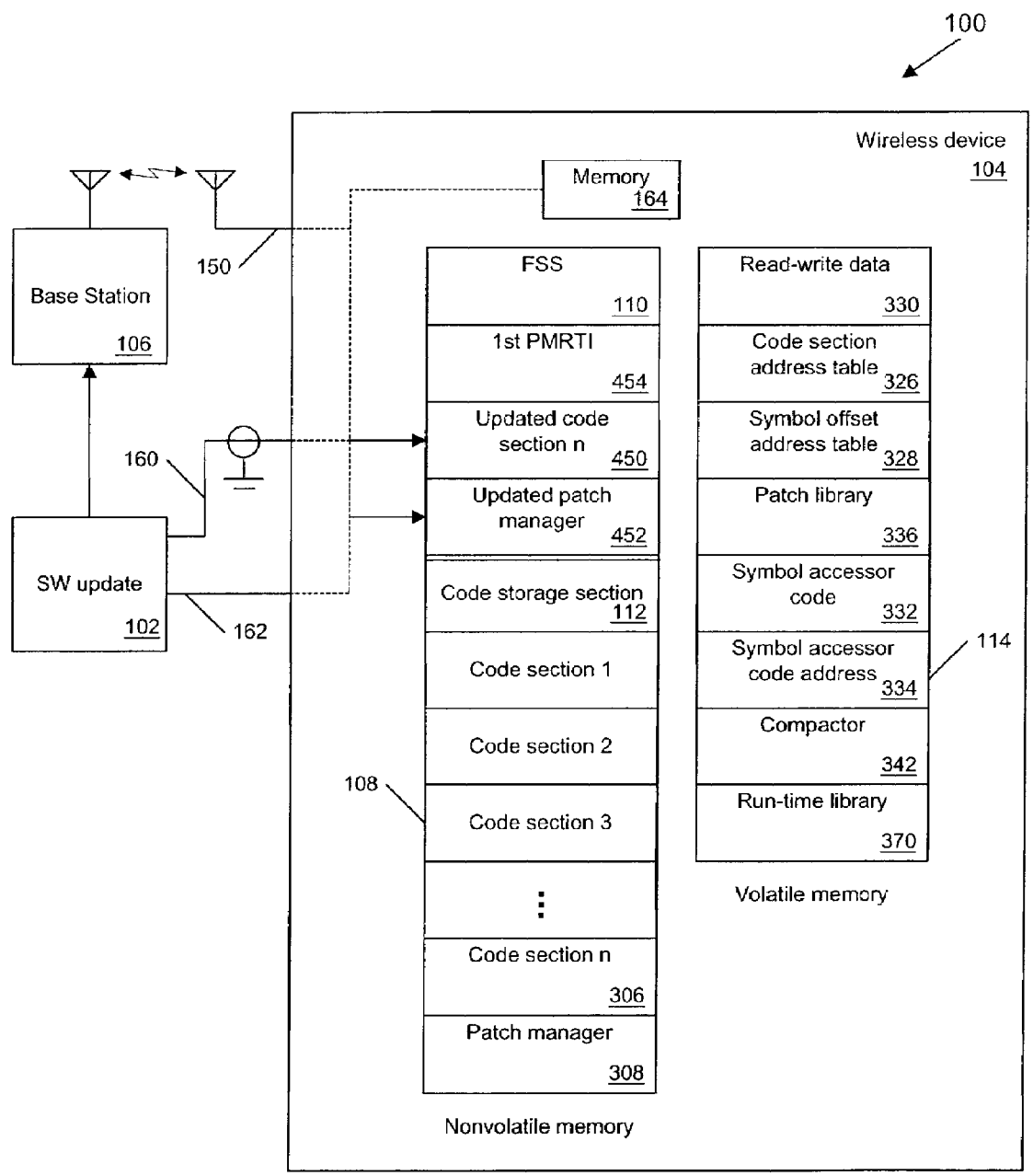
FIG. 1 is a schematic block diagram of the overall wireless device software maintenance system.

Certain embodiments as disclosed herein provide for systems and methods for bidirectional communication of dynamic instruction sets between a wireless communication device and a wireless communication network. For example, one method as disclosed herein allows for a wireless communication device to dynamically construct an instruction set and send that instruction set to the network for execution and processing.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Some portions of the detailed descriptions that follow are presented in terms of procedures, steps, logic blocks, codes, processing, and other symbolic representations of operations on data bits within a wireless device microprocessor or memory. These descriptions and representations are the means used by those skilled in the data processing arts to most effectively convey the substance of their work to others skilled in the art. A procedure, microprocessor executed step, application, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a microprocessor based wireless device. It has proven convenient at times, principally for reasons of common usage, to refer to these signals as bits, values, elements, symbols, characters, terms, numbers, or the like. Where physical devices, such as a memory are mentioned, they are connected to other physical devices through a bus or other electrical connection. These physical devices can be considered to interact with logical processes or applications and, therefore, are "connected" to logical operations. For example, a memory can store or access code to further a logical operation, or an application can call a code section from memory for execution.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "connecting" or "translating" or "displaying" or "prompting" or "determining" or "displaying" or "recognizing" or the like, refer to the action and processes of in a wireless device microprocessor system that manipulates and transforms data represented as physical (electronic) quantities within the computer system's registers and memories into other data similarly represented as physical quantities within the wireless device memories or registers or other such information storage, transmission or display devices.

FIG. 1 is a schematic block diagram of the overall wireless device software maintenance system 100. The present invention system software organization is presented in detail below, following a general overview of the software maintenance system 100. The general system 100 describes a process of delivering system software updates and instruction sets (programs), and installing the delivered software in a wireless device. System software updates and patch manager run time instructions (PMRTI), that are more generally known as instruction sets or dynamic instruction sets, are created by the manufacturer of the handsets. The system software is organized into symbol libraries. The symbol libraries are arranged into code sections. When symbol libraries are to be updated, the software update 102 is transported as one or more code sections. The software update is broadcast to wireless devices in the field, of which wireless communications device 104 is representative, or transmitted in separate communications from a base station 106 using well known, conventional air, data or message transport protocols. The invention is not limited to any particular transportation format, as the wireless communications device can be easily modified to process any available over-the-air transport protocol for the purpose of receiving system software and PMRTI updates.

The system software can be viewed as a collection of different subsystems. Code objects can be tightly coupled into one of these abstract subsystems and the resulting collection can be labeled as a symbol library. This provides a logical breakdown of the code base and software patches and fixes can be associated with one of these symbol libraries. In most cases, a single update is associated with one, or at most two, symbol libraries. The rest of the code base, the other symbol libraries, remains unchanged.

The notion of symbol libraries provides a mechanism to deal with code and constants. The read-write (RW) data, on the other hand, fits into a unique individual RW library that contains RAM based data for all libraries.

Once received by the wireless device 104, the transported code section must be processed. This wireless device overwrites a specific code section of nonvolatile memory 108. The nonvolatile memory 108 includes a file system section (FSS) 110 and a code storage section 112. The code section is typically compressed before transport in order to minimize occupancy in the FSS 110. Often the updated code section will be accompanied by its RW data, which is another kind of symbol library that contains all the RW data for each symbol library. Although loaded in random access volatile read-write memory 114 when the system software is executing, the RW data always needs to be stored in the nonvolatile memory 108, so it can be loaded into random access volatile read-write memory 114 each time the wireless device is reset. This includes the first time RW data is loaded into random access volatile read-write memory. As explained in more detail below, the RW data is typically arranged with a patch manager code section.

The system 100 includes the concept of virtual tables. Using such tables, symbol libraries in one code section can be patched (replaced), without breaking (replacing) other parts of the system software (other code sections). Virtual tables execute from random access volatile read-write memory 114 for efficiency purposes. A code section address table and symbol offset address table are virtual tables.

The updated code sections are received by the wireless device 104 and stored in the FSS 110. A wireless device user interface (UI) will typically notify the user that new software is available. In response to UI prompts the user acknowledges the notification and signals the patching or updating operation. Alternately, the updating operation is performed automatically. The wireless device may be unable to perform standard communication tasks as the updating process is performed. The patch manager code section includes a non-volatile read-write driver symbol library that is also loaded into random access volatile read-write memory 114. The nonvolatile read-write driver symbol library causes code sections to be overwritten with updated code sections. The patch manager code section includes the read-write data, code section address table, and symbol offset address table, as well a symbol accessor code and the symbol accessor code address (discussed below). Portions of this data are invalid when updated code sections are introduced, and an updated patch manager code sections includes read-write data, a code section address table, and a symbol offset address table valid for the updated code sections. Once the updated code sections are loaded into the code storage section 112, the wireless device is reset. Following the reset operation, the wireless device can execute the updated system software. It should also be understood that the patch manager code section may include other symbol libraries that have not been discussed above. These other symbol libraries need not be loaded into read-write volatile memory 114.

Figure 2:
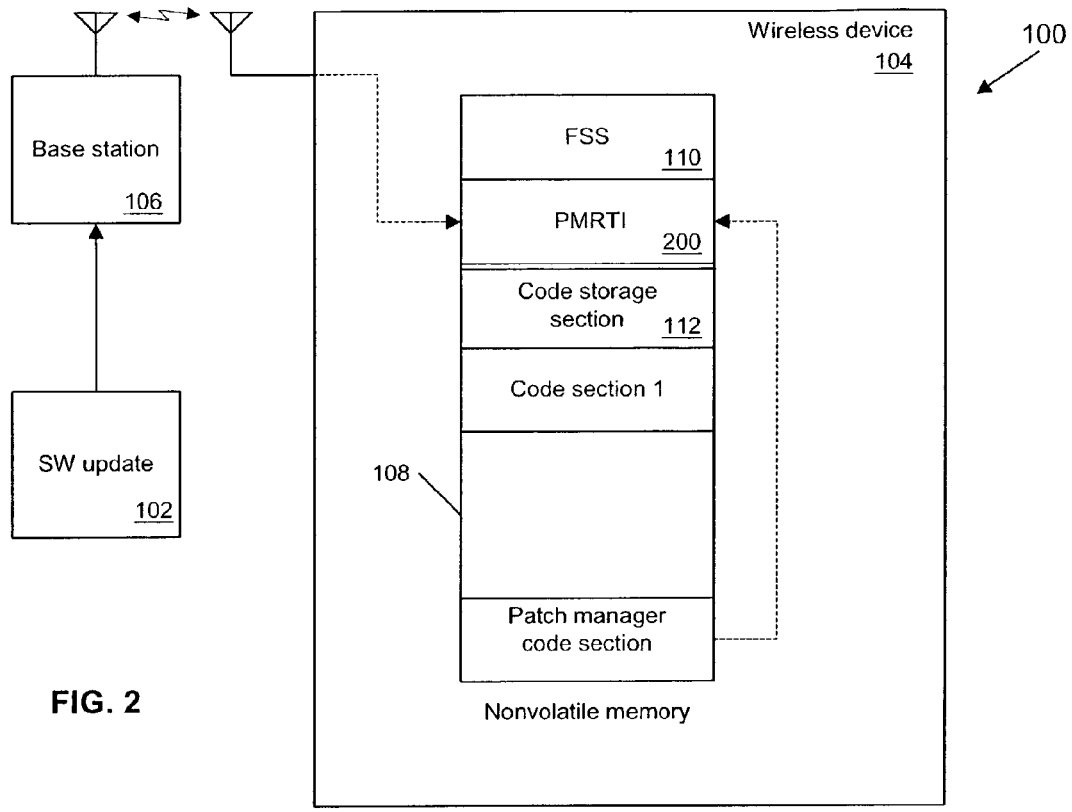
FIG. 2 is a schematic block diagram of the software maintenance system, highlighting the installation of instruction sets via the airlink interface.

FIG. 2 is a schematic block diagram of the software maintenance system 100, highlighting the installation of instruction sets via the airlink interface. In addition to updating system software code sections, the maintenance system 100 can download and install dynamic instructions sets, programs, or patch manager instruction sets (PMIS), referred to herein as patch manager run time instructions (PMRTI). The PMRTI code section 200 is transported to the wireless device 104 in the same manner as the above-described system software code sections. PMRTI code sections are initially stored in the FSS 110. A PMRTI code section is typically a binary file that may be visualized as compiled instructions to the handset. A PMRTI code section is comprehensive enough to provide for the performance of basic mathematical operations and the performance of conditionally executed operations. For example, an RF calibration PMRTI could perform the following operations:

IF RF CAL ITEM IS LESS THAN X
EXECUTE INSTRUCTION
ELSE
EXECUTE INSTRUCTION

A PMRTI can support basic mathematical operations, such as: addition, subtraction, multiplication, and division. As with the system software code sections, the PMRTI code section may be loaded in response to UI prompts, and the wireless device must be reset after the PMRTI is loaded into code storage section 112. Then the PMRTI section can be executed. If the PMRTI code section is associated with any virtual tables or read-write data, an updated patch manager code section will be transported with the PMRTI for installation in the code storage section 112. Alternately, the PMRTI can be kept and processed from the FSS 110. After the handset 104 has executed all the instructions in the PMRTI section, the PMRTI section can be deleted from the FSS 110. Alternately, the PMRTI is maintained for future operations. For example, the PMRTI may be executed every time the wireless device is energized.

PMRTI is a very powerful runtime instruction engine. The handset can execute any instruction delivered to it through the PMRTI environment. This mechanism may be used to support RF calibrations. More generally, PMRTI can be used to remote debug wireless device software when software problems are recognized by the manufacturer or service provider, typically as the result of user complaints. PMRTI can also record data needed to diagnose software problems. PMRTI can launch newly downloaded system applications for data analysis, debugging, and fixes. PMRTI can provide RW data based updates for analysis and possible short term fix to a problem in lieu of an updated system software code section. PMRTI can provide memory compaction algorithms for use by the wireless device.

In some aspects of the invention, the organization of the system software into symbol libraries may impact the size of the volatile memory 114 and nonvolatile memory 108 required for execution. This is due to the fact that the code sections are typically larger than the symbol libraries arranged in the code sections. These larger code sections exist to accommodate updated code sections. Organizing the system software as a collection of libraries impacts the nonvolatile memory size requirement. For the same code size, the amount of nonvolatile memory used will be higher due to the fact that code sections can be sized to be larger than the symbol libraries arranged within.

Once software updates have been delivered to the wireless device, the software maintenance system 100 supports memory compaction. Memory compaction is similar to disk de-fragmentation applications in desktop computers. The compaction mechanism ensures that memory is optimally used and is well balanced for future code section updates, where the size of the updated code sections are unpredictable. The system 100 analyzes the code storage section as it is being patched (updated). The system 100 attempts to fit updated code sections into the memory space occupied by the code section being replaced. If the updated code section is larger than the code section being replaced, the system 100 compacts the code sections in memory 112. Alternately, the compaction can be calculated by the manufacturer or service provider, and compaction instructions can be transported to the wireless device 104.

Compaction can be a time consuming process owing to the complexity of the algorithm and also the vast volume of data movement. The compaction algorithm predicts feasibility before it begins any processing. UI prompts can be used to apply for permission from the user before the compaction is attempted.

In some aspects of the invention, all the system software code sections can be updated simultaneously. A complete system software upgrade, however, would require a larger FSS 110.

Figure 3:
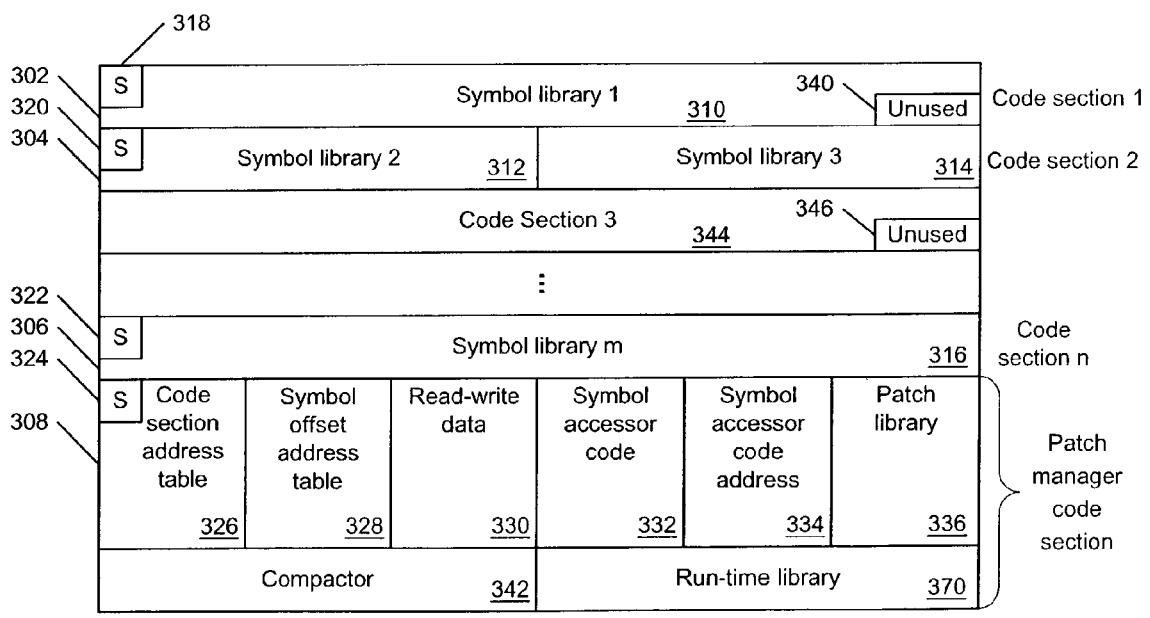
FIG. 3 is a schematic block diagram illustrating the present invention system for executing dynamic instruction sets in a wireless communications device.

FIG. 3 is a schematic block diagram illustrating the present invention dynamic instruction set execution in a wireless communications device. The system 300 comprises a code storage section 112 in memory 108 including executable wireless device system software differentiated into a plurality of current code sections. Code section one (302), code section two (304), code section n (306), and a patch manager code section 308 are shown. However, the invention is not limited to any particular number of code sections. Further, the system 300 further comprises a first plurality of symbol libraries arranged into the second plurality of code sections. Shown are symbol library one (310) arranged in code section one (302), symbol libraries two (312) and three (314) arranged in code section two (304), and symbol library m (316) arranged in code section n (306). Each library comprises symbols having related functionality. For example, symbol library one (310) may be involved in the operation of the wireless device liquid crystal display (LCD). Then, the symbols would be associated with display functions. As explained in detail below, additional symbol libraries are arranged in the patch manger code section 308.

Figures 4, 5:
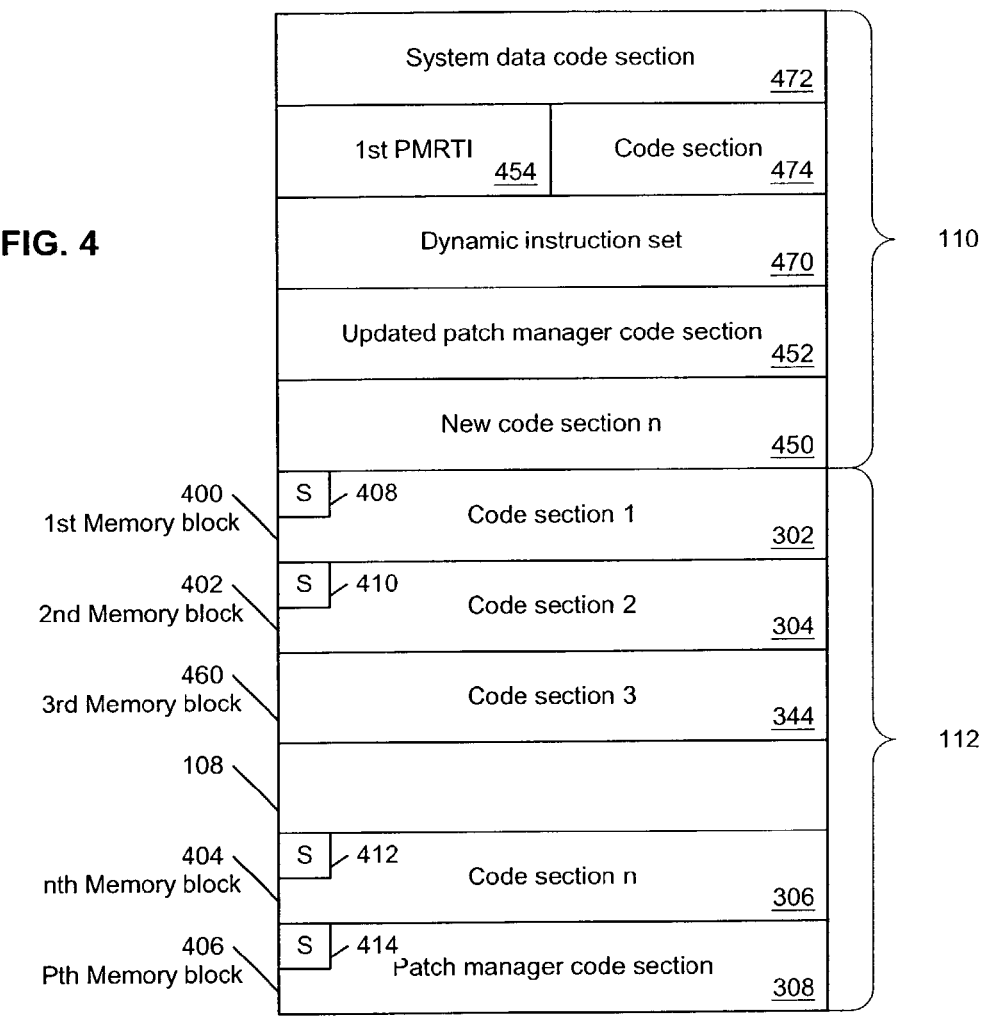
FIG. 4 is a schematic block diagram of the wireless device memory.
FIG. 5 is a table representing the code section address table of FIG. 3.

FIG. 4 is a schematic block diagram of the wireless device memory. As shown, the memory is the code storage section 112 of FIG. 1. The memory is a writeable, nonvolatile memory, such as Flash memory. It should be understood that the code sections need not necessarily be stored in the same memory as the FSS 110. It should also be understood that the present invention system software structure could be enabled with code sections stored in a plurality of cooperating memories. The code storage section 112 includes a second plurality of contiguously addressed memory blocks, where each memory block stores a corresponding code section from the second plurality of code sections. Thus, code section one (302) is stored in a first memory block 400, code section two (304) in the second memory block 402, code section n (306) in the nth memory block 404, and the patch manager code section (308) in the pth memory block 406.

Contrasting FIGS. 3 and 4, the start of each code section is stored at corresponding start addresses in memory, and symbol libraries are arranged to start at the start of code sections. That is, each symbol library begins at a first address and runs through a range of addresses in sequence from the first address. For example, code section one (302) starts at the first start address 408 (marked with "S") in code storage section memory 112. In FIG. 3, symbol library one (310) starts at the start 318 of the first code section. Likewise code section two (304) starts at a second start address 410 (FIG. 4), and symbol library two starts at the start 320 of code section two (FIG. 3). Code section n (306) starts at a third start address 412 in code storage section memory 112 (FIG. 4), and symbol library m (316) starts at the start of code section n 322 (FIG. 3). The patch manager code section starts at pth start address 414 in code storage section memory 112, and the first symbol library in the patch manager code section 308 starts at the start 324 of the patch manager code section. Thus, symbol library one (310) is ultimately stored in the first memory block 400. If a code section includes a plurality of symbol libraries, such as code section two (304), the plurality of symbol libraries are stored in the corresponding memory block, in this case the second memory block 402.

In FIG. 3, the system 300 further comprises a code section address table 326 as a type of symbol included in a symbol library arranged in the patch manager code section 308. The code section address table cross-references code section identifiers with corresponding code section start addresses in memory.

FIG. 5 is a table representing the code section address table 326 of FIG. 3. The code section address table 326 is consulted to find the code section start address for a symbol library. For example, the system 300 seeks code section one when a symbol in symbol library one is required for execution. To find the start address of code section one, and therefore locate the symbol in symbol library one, the code section address table 326 is consulted. The arrangement of symbol libraries in code sections, and the tracking of code sections with a table permits the code sections to be moved or expanded. The expansion or movement operations may be needed to install upgraded code sections (with upgraded symbol libraries).

Returning to FIG. 3, it should be noted that not every symbol library necessarily starts at the start of a code section. As shown, symbol library three (314) is arranged in code section two (304), but does not start of the code section start address 320. Thus, if a symbol in symbol library three (314) is required for execution, the system 300 consults the code section address table 326 for the start address of code section two (304). As explained below, a symbol offset address table permits the symbols in symbol library three (314) to be located. It does not matter that the symbols are spread across multiple libraries, as long as they are retained with the same code section.

As noted above, each symbol library includes functionally related symbols. A symbol is a programmer-defined name for locating and using a routine body, variable, or data structure. Thus, a symbol can be an address or a value. Symbols can be internal or external. Internal symbols are not visible beyond the scope of the current code section. More specifically, they are not sought by other symbol libraries, in other code sections. External symbols are used and invoked across code sections and are sought by libraries in different code sections. The symbol offset address table typically includes a list of all external symbols.

For example, symbol library one (310) may generate characters on a wireless device display. Symbols in this library would, in turn, generate telephone numbers, names, the time, or other display features. Each feature is generated with routines, referred to herein as a symbol. For example, one symbol in symbol library one (310) generates telephone numbers on the display. This symbol is represented by an "X", and is external. When the wireless device receives a phone call and the caller ID service is activated, the system must execute the "X" symbol to generate the number on the display. Therefore, the system must locate the "X" symbol.

Figures 6, 7:
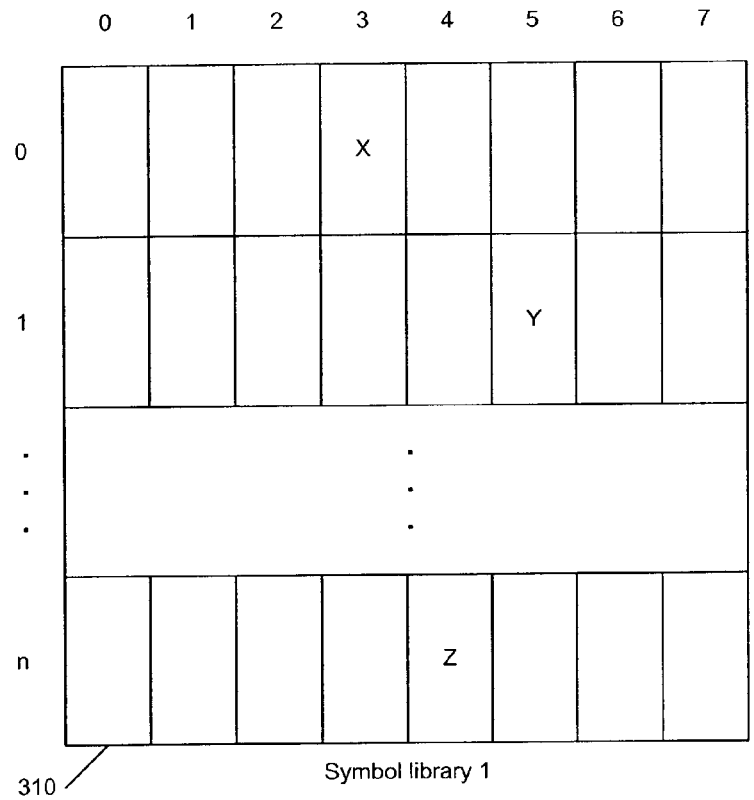
FIG. 6 is a detailed depiction of symbol library one of FIG. 3, with symbols.
FIG. 7 is a table representing the symbol offset address table of FIG. 3.

FIG. 6 is a detailed depiction of symbol library one (310) of FIG. 3, with symbols. Symbols are arranged to be offset from respective code section start addresses. In many circumstances, the start of the symbol library is the start of a code section, but this is not true if a code section includes more than one symbol library. Symbol library one (310) starts at the start of code section one (see FIG. 3). As shown in FIG. 6, the "X" symbol is located at an offset of (03) from the start of the symbol library and the "Y" symbol is located at an offset of (15). The symbol offset addresses are stored in a symbol offset address table 328 in the patch manager code section (see FIG. 3).

FIG. 7 is a table representing the symbol offset address table 328 of FIG. 3. The symbol offset address table 328 cross-references symbol identifiers with corresponding offset addresses, and with corresponding code section identifiers in memory. Thus, when the system seeks to execute the "X" symbol in symbol library one, the symbol offset address table 328 is consulted to locate the exact address of the symbol, with respect to the code section in which it is arranged.

Returning to FIG. 3, the first plurality of symbol libraries typically all include read-write data that must be consulted or set in the execution of these symbol libraries. For example, a symbol library may include an operation dependent upon a conditional statement. The read-write data section is consulted to determine the status required to complete the conditional statement. The present invention groups the read-write data from all the symbol libraries into a shared read-write section. In some aspects of the invention, the read-write data 330 is arranged in the patch manager code section 308. Alternately (not shown), the read-write data can be arranged in a different code section, code section n (306), for example.

The first plurality of symbol libraries also includes symbol accessor code arranged in a code section to calculate the address of a sought symbol. The symbol accessor code can be arranged and stored at an address in a separate code section, code section two (304), for example. However, as shown, the symbol accessor code 332 is arranged and stored at an address in the patch manager code section 308. The system 300 further comprises a first location for storage of the symbol accessor code address. The first location can be a code section in the code storage section 112, or in a separate memory section of the wireless device (not shown). The first location can also be arranged in the same code section as the read-write data. As shown, the first location 334 is stored in the patch manager code section 308 with the read-write data 330, the symbol offset address table 328, the code section address table 326, and the symbol accessor code 332, and the patch library (patch symbol library) 336.

The symbol accessor code accesses the code section address table and symbol offset address tables to calculate, or find the address of a sought symbol in memory. That is, the symbol accessor code calculates the address of the sought symbol using a corresponding symbol identifier and a corresponding code section identifier. For example, if the "X" symbol in symbol library one is sought, the symbol accessor is invoked to seek the symbol identifier (symbol ID) "X_1", corresponding to the "X" symbol (see FIG. 7). The symbol accessor code consults the symbol offset address table to determine that the "X_1" symbol identifier has an offset of (03) from the start of code section one (see FIG. 6). The symbol accessor code is invoked to seek the code section identifier "CS_1", corresponding to code section one. The symbol accessor code consults the code section address table to determine the start address associated with code section identifier (code section ID) "CS_1". In this manner, the symbol accessor code determines that the symbol identifier "X_1" is offset (03) from the address of (00100), or is located at address (00103).

The symbol "X" is a reserved name since it is a part of the actual code. In other words, it has an absolute data associated with it. The data may be an address or a value. The symbol identifier is an alias created to track the symbol. The symbol offset address table and the code section address table both work with identifiers to avoid confusion with reserved symbol and code section names. It is also possible that the same symbol name is used across many symbol libraries. The use of identifiers prevents confusion between these symbols.

Returning to FIG. 1, the system 300 further comprises a read-write volatile memory 114, typically random access memory (RAM). The read-write data 330, code section address table 326, the symbol offset address table 328, the symbol accessor code 332, and the symbol accessor code address 334 are loaded into the read-write volatile memory 114 from the patch manager code section for access during execution of the system software. As is well known, the access times for code stored in RAM is significantly less than the access to a nonvolatile memory such as Flash.

Returning to FIG. 3, it can be noted that the symbol libraries need not necessarily fill the code sections into which they are arranged, although the memory blocks are sized to exactly accommodate the corresponding code sections stored within. Alternately stated, each of the second plurality of code sections has a size in bytes that accommodates the arranged symbol libraries, and each of the contiguously addressed memory blocks have a size in bytes that accommodates corresponding code sections. For example, code section one (302) may be a 100 byte section to accommodate a symbol library having a length of 100 bytes. The first memory block would be 100 bytes to match the byte size of code section one. However, the symbol library loaded into code section 1 may be smaller than 100 bytes. As shown in FIG. 3, code section one (302) has an unused section 340, as symbol library one (310) is less than 100 bytes. Thus, each of the second plurality of code sections may have a size larger than the size needed to accommodate the arranged symbol libraries. By "oversizing" the code sections, larger updated symbol libraries can be accommodated.

Contiguously addressed memory blocks refers to partitioning the physical memory space into logical blocks of variable size. Code sections and memory blocks are terms that are essentially interchangeable when the code section is stored in memory. The concept of a code section is used to identify a section of code that is perhaps larger than the symbol library, or the collection of symbol libraries in the code section as it is moved and manipulated.

As seen in FIG. 3, the system 300 includes a patch symbol library, which will be referred to herein as patch library 336, to arrange new code sections in the code storage section with the current code sections. The arrangement of new code sections with current code sections in the code storage section forms updated executable system software. The patch manager 336 not only arranges new code sections in with the current code sections, it also replaces code sections with updated code sections.

Returning to FIG. 4, the file system section 10 of memory 108 receives new code sections, such as new code section 450 and updated patch manager code section 452. The file system section also receives a first patch manager run time instruction (PMRTI) 454 including instructions for arranging the new code sections with the current code sections. As seen in FIG. 1, an airlink interface 150 receives new, or updated code sections, as well as the first PMRTI. Although the airlink interface 150 is being represented by an antenna, it should be understood that the airlink interface would also include an RF transceiver, baseband circuitry, and demodulation circuitry (not shown). The file system section 110 stores the new code sections received via the airlink interface 150. The patch library 336, executing from read-write volatile memory 114, replaces a first code section in the code storage section, code section n (306) for example, with the new, or updated code section 450, in response to the first PMRTI 454. Typically, the patch manager code section 308 is replaced with the updated patch manager code section 452. When code sections are being replaced, the patch library 336 over-writes the first code section, code section n (306) for example, in the code storage section 112 with the updated code sections, code section 450 for example, in the file system section 110. In the extreme case, all the code sections in code storage section 112 are replaced with updated code sections. That is, the FSS 110 receives a second plurality of updated code sections (not shown), and the patch library 336 replaces the second plurality of code sections in the code storage section 112 with the second plurality of updated code sections. Of course, the FSS 110 must be large enough to accommodate the second plurality of updated code sections received via the airlink interface.

As noted above, the updated code sections being received may include read-write data code sections, code section address table code sections, symbol libraries, symbol offset address table code sections, symbol accessor code sections, or a code section with a new patch library. All these code sections, with their associated symbol libraries and symbols, may be stored as distinct and independent code sections. Then each of these code sections would be replaced with a unique updated code section. That is, an updated read-write code section would be received and would replace the read-write code section in the code storage section. An updated code section address table code section would be received and would replace the code section address table code section in the code storage section. An updated symbol offset address table code section would be received and would replace the symbol offset address table code section in the code storage section. An updated symbol accessor code section would be received and would replace the symbol accessor code section in the code storage section. Likewise, an updated patch manager code section (with a patch library) would be received and would replace the patch manager code section in the code storage section.

However, the above-mentioned code sections are typically bundled together in the patch manager code section. Thus, the read-write code section in the code storage section is replaced with the updated read-write code section from the file system section 110 when the patch manager code section 308 is replaced with the updated patch manger code section 450. Likewise, the code section address table, the symbol offset address table, the symbol accessor code sections, as well as the patch library are replaced when the updated patch manager code section 450 is installed. The arrangement of the new read-write data, the new code section address table, the new symbol offset address table, the new symbol accessor code, and the new patch library as the updated patch manager code section 450, together with the current code sections in the code storage section, forms updated executable system software.

When the file system section 10 receives an updated symbol accessor code address, the patch manager replaces the symbol accessor code address in the first location in memory with updated symbol accessor code address. As noted above, the first location in memory 334 is typically in the patch manager code section (see FIG. 3).

As seen in FIG. 3, the patch library 308 is also includes a compactor, or a compactor symbol library 342. The compactor 342 can also be enabled as a distinct and independent code section, however as noted above, it is useful and efficient to bundle the functions associated with system software upgrades into a single patch manager code section. Generally, the compactor 342 can be said to resize code sections, so that new sections can be arranged with current code sections in the code storage section 112.

With the organization, downloading, and compaction aspects of the invention now established, the following discussion will center on the wireless communications device dynamic instruction set execution system 300. The system 300 comprises executable system software and system data differentiated into code sections, as discussed in great detail, above. Further, the system 300 comprises dynamic instruction sets for operating on the system data and the system software, and controlling the execution of the system software. As seen in FIG. 4, a dynamic instruction set 470 is organized into the first PMRTI 454. As seen in FIG. 3, the system also comprises a run-time engine for processing the dynamic instruction sets, enabled as run-time library 370. As with the compactor library 342 and patch library 336 mentioned above, the runtime library 370 is typically located in the patch manager code section 308. However, the runtime library 370 could alternately be located in another code section, for example the first code section 304.

The dynamic instruction sets are a single, or multiple sets of instructions that include conditional operation code, and generally include data items. The run-time engine reads the operation code and determines what operations need to be performed. Operation code can be conditional, mathematical, procedural, or logical. The run-time engine, or run-time library 370 processes the dynamic instruction sets to perform operations such as mathematical or logical operations. That is, the run-time engine reads the dynamic instruction set 470 and performs a sequence of operations in response to the operation code. Although the dynamic instruction sets are not limited to any particular language, the operation code is typically a form of machine code, as the wireless device memory is limited and execution speed is important. The operation code is considered conditional in that it analyzes a data item and makes a decision as a result of the analysis. The run-time engine may also determine that an operation be performed on data before it is analyzed.

For example, the operation code may specify that a data item from a wireless device memory be compared to a predetermined value. If the data item is less than the predetermined value, the data item is left alone, and if the data item is greater than the predetermined value, it is replaced with the predetermined value. Alternately, the operation code may add a second predetermined value to a data item from the wireless device memory, before the above-mentioned comparison operation is performed.

As mentioned above, the file system section nonvolatile memory 110 receives the dynamic instruction sets through an interface such as the airlink 150. As shown in FIG. 1, the interface can also be radio frequency (RF) hardline 160. Then, the PMRTI can be received by the FSS 110 without the system software being operational, such as in a factory calibration environment. The PMRTI can also be received via a logic port interface 162 or an installable memory module 164. The memory module 164 can be installed in the wireless device 104 at initial calibration, installed in the field, or installed during factory recalibration. Although not specially shown, the PMRTI can be received via an infrared or Bluetooth interfaces.

Figure 8:
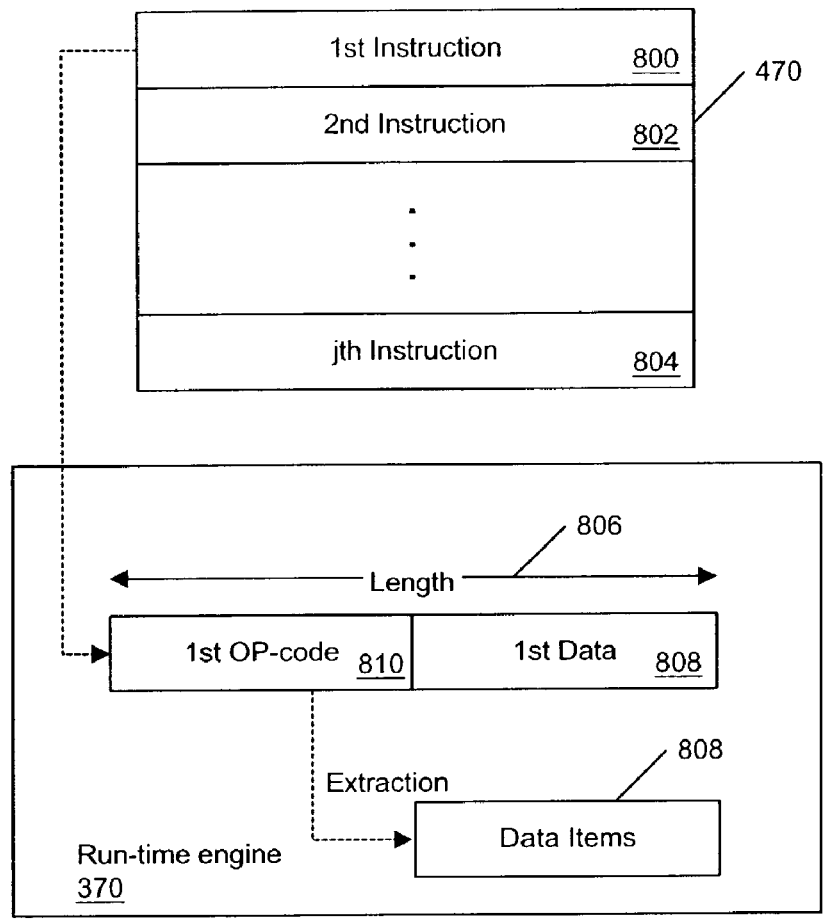
FIG. 8 is a depiction of the operation code ("opcode") being accessed by the run-time engine.

FIG. 8 is a depiction of instructions being accessed by the run-time engine 370. Shown is a first instruction 800, a second instruction 802, and a jth instruction 804, however, the dynamic instruction set is not limited to any particular number of instructions. The length of the operation code in each instruction is fixed. The run-time engine 370 captures the length of the instruction, as a measure of bytes or bits, determine if the instruction includes data items. The remaining length of the instruction, after the operation code is subtracted, includes the data items. The runtime engine extracts the data items from the instruction. As shown, the length 806 of the first instruction 800 is measured and data items 808 are extracted. Note that not all instructions necessary include data items to be extracted. The run-time engine 370 uses the extracted data 808 in performing the sequence of operations responsive to the operation code 810 in instruction 800.

Figure 9:
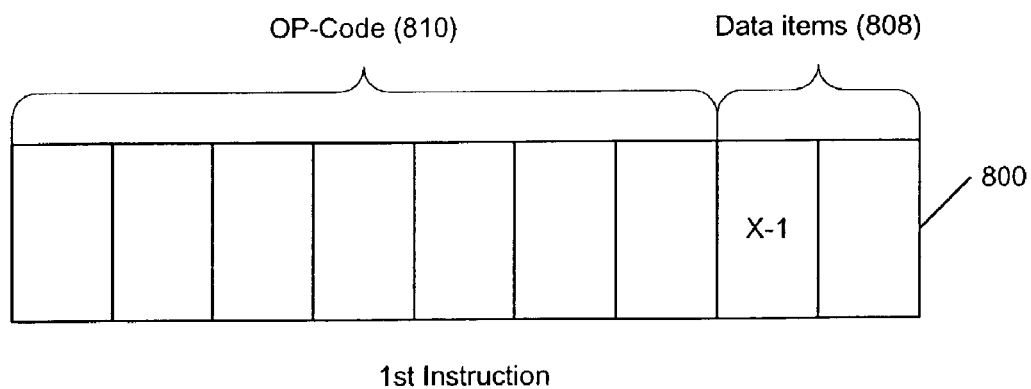
FIG. 9 is a more detailed depiction of the first operation code of FIG. 8.

FIG. 9 is a more detailed depiction of the first instruction 800 of FIG. 8. Using the first instruction 800 as an example, the instruction includes operation code 810 and data 808. The instruction, and more specifically, the data item section 808 includes symbol identifiers, which act as a link to symbols in the wireless device code sections. As explained in detail above, the symbol identifiers are used with the code section address table 326 (see FIG. 5) and the symbol offset address table 328 (see FIG. 7) to locate the symbol corresponding to the symbol identifier. As shown, a symbol identifier "X_1" is shown in the first instruction 800. The symbol offset address table 328 locates the corresponding symbol in a code section with the "CS_1" identifier and an offset of "3". The code section address table 326 gives the start address of code section one (302). In this manner, the symbol "X" is found (see FIG. 6).

After the run-time engine locates symbols corresponding to the received symbol identifiers using the code section address table and symbol offset address table, it extracts data when the located symbols are data items. For example, if the symbol "X" is a data item in symbol library one (310), the run-time engine extracts it. Alternately, the "X" symbol can be operation code, and the run-time engine executes the symbol "X" when it is located.

PMRTI can be used to update system data, or system data items. In some aspects of the invention system data is stored in a code section in the file system section 110, code section 472 for example, see FIG. 4. The run-time engine accesses system data from code section 472 and analyzes the system data. The run-time engine processes the operation code of the dynamic instruction sets to perform mathematical or logical operation on data items, as described above. After the operation, the run-time engine processes the instructions to create updated system data. Note that the updated system data may include unchanged data items in some circumstances. The system data in the second code section 472 is replaced with the updated system data in response to the operation code. Thus, by the processing of instruction by the run-time engine, the system software is controlled to execute using the updated system data in code section 472. In this manner, specifically targeted symbols in the system software can be updated, without replacing entire code sections. By the same process, the system data can be replaced in a code section in the code storage section 112. For example, the system data can be stored in the third code section 344, and the run-time engine can replace the system data in the third code section with updated system data in response to the operation code.

PMRTI can also be used to update data items in volatile memory 114. As an example, the volatile memory 114 accept read-write data 330, see FIG. 1. The read-write data can be from one, or from a plurality of code sections in the code storage section 112 and/or the FSS 110. The run-time engine accesses the read-write data, analyzes the read-write data 330, creates updated read-write data, and replaces the read-write data 330 in the volatile memory 114 with the updated read-write data in response to the operation code. Then, the system software is controlled to execute using the updated read-write data in volatile memory 114.

In some aspects of the invention, the run-time engine monitors the execution of the system software. Performance monitoring is broadly defined to include a great number of wireless device activities. For example, data such as channel parameters, channel characteristics, system stack, error conditions, or a record of data items in RAM through a sequence of operations leading to a specific failure condition or reduced performance condition can be collected. It is also possible to use dynamic instructions sets to analyze collected performance data, provide updated data variants, and recapture data to study possible solutions to the problem. Temporary fixes can also be provisioned using PMRTI processes.

More specifically, the run-time engine collects performance data, and stores the performance data in the file system section in response to the operation code. Then, the system software is controlled to execute by collecting the performance data for evaluation of the system software. Evaluation can occur as a form of analysis performed by dynamic instruction set operation code, or it can be performed outside the wireless device. In some aspects of the invention, the run-time engine accesses the performance data that has been collected from the file system section and transmits the performance data via an airlink interface in response to the operation code. Collecting performance data from wireless devices in the field permits a manufacturer to thoroughly analyze problems, either locally or globally, without recalling the devices.

In some aspects of the invention, file system section 110 receives a patch manager run time instruction including a new code section. For example, a new code section 474 is shown in FIG. 4. Alternately, the new code section can be independent of the PMRTI, such as new code section n (450). For example, the new code section n (450) may have been received in earlier airlink communications, or have been installed during factory calibration. The run-time engine adds the new code section 474 (450) to the code storage section in response to the operation code. In some aspects of the invention, the new code section is added to an unused block in the code storage section 112. Alternately, a compaction operation is required. Then, the system software is controlled to execute using the new code section 474 (450). In other aspects of the invention, the PMRTI 454 includes an updated code section 474. Alternately, the new code section 450 is an updated code section independent of the PMRTI. The run-time engine replaces a code section in the code storage section, code section two (304) for an example, with the updated code section 474 (450) in response to the operation code. The system software is controlled to execute using the updated code section 474

(450). In some aspects of the invention a compaction operation is required to accommodate the updated code section. Alternately, the updated code section is added to an unused or vacant section of the code storage section.

As explained above, the addition of a new code section or the updating of a code section typically requires the generation of a new code section address table, as these operation involve either new and/or changed code section start addresses. Further, a compaction operation also requires a new code section address table. The compaction operations may be a result of the operation of the compactor 342, explained above, or the result of PMRTI instructions that supply details as to how the compaction is to occur. When the PMRTI includes downloading and compaction instructions, the PMRTI typically also includes a new code section address table that becomes valid after the downloading and compaction operations have been completed.

Figure 10:
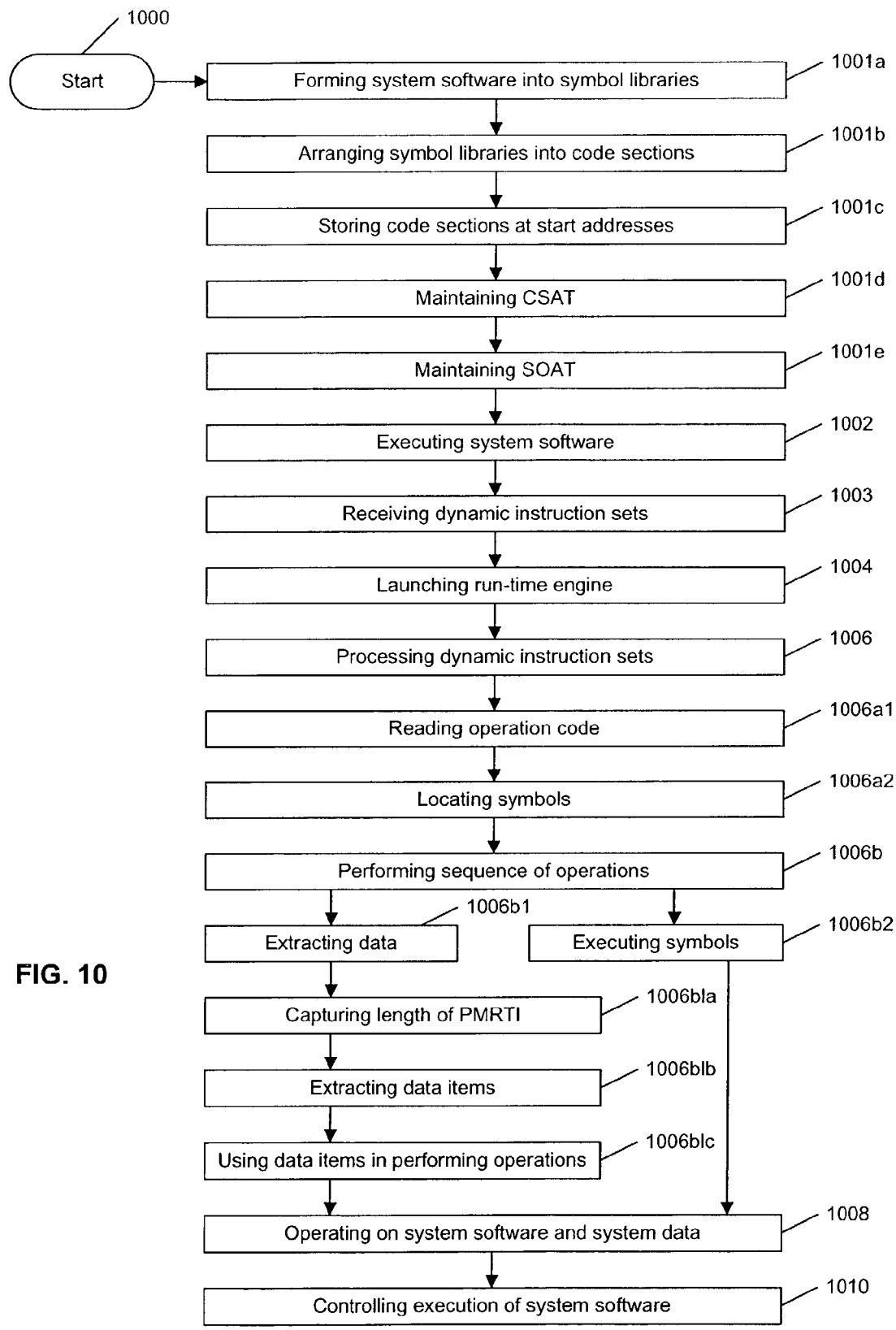
FIGS. 10 is a flowchart illustrating the present invention method for executing dynamic instruction sets in a wireless communications device.

FIGS. 10*a* and 10*b* are flowcharts illustrating the present invention method for executing dynamic instruction sets in a wireless communications device. Although depicted as a sequence of numbered steps for clarity, no order should be inferred from the numbering (and the numbering in the methods presented below) unless explicitly stated. The method starts at Step 1000. Step 1001*a* forms the system software into symbol libraries, each symbol library comprising symbols having related functionality. Step 1001*b* arranges the symbol libraries into code sections. Step 1002 executes system software. Step 1003 receives the dynamic instruction sets. Receiving the dynamic instruction sets in Step 1003 includes receiving the dynamic instruction sets through an interface selected from the group including airlink, radio frequency (RF) hardline, installable memory module, infrared, and logic port interfaces. In some aspects of the invention, receiving the dynamic instruction set in Step 1003 includes receiving a patch manager run time instruction (PMRTI) in a file system section nonvolatile memory.

Step 1004 launches a run-time engine. Typically, launching a run-time engine includes invoking a run-time library from a first code section. The run-time engine can be launched from either volatile or nonvolatile memory. Step 1006 processes dynamic instruction sets. Processing dynamic instruction sets includes processing instructions in response to mathematical and logical operations. In some aspects of the invention, Step 1007 (not shown), following the processing of the dynamic instruction sets, deletes dynamic instruction sets. Step 1008 operates on system data and system software. Step 1010, in response to operating on the system data and system software, controls the execution of the system software.

Typically, receiving the patch manager run time instructions in Step 1003 includes receiving conditional operation code and data items. Then, processing dynamic instruction sets in Step 1006 includes substeps. Step 1006*a*1 uses the run-time engine to read the patch manager run time instruction operation code. Step 1006*b* performs a sequence of operations in response to the operation code.

In some aspects, arranging the symbol libraries into code sections in Step 1001*b* includes starting symbol libraries at the start of code sections and arranging symbols to be offset from their respective code section start addresses. Then the method comprises further steps. Step 1001*c* stores the start of code sections at corresponding start addresses. Step 1001*d* maintains a code section address table (CSAT) cross-referencing code section identifiers with corresponding start addresses. Step 1001*e* maintains a symbol offset address table (SOAT) cross-referencing symbol identifiers with corresponding offset addresses, and corresponding code section identifiers.

In some aspects of the invention, receiving the patch manager run time instruction in Step 1003 includes receiving symbol identifiers. Then, the method comprises a further step. Step 1006*a*2 locates symbols corresponding to the received symbol identifiers by using the code section address table and symbol offset address table. Performing a sequence of operations in response to the operation code in Step 1006*b* includes substeps. Step 1006*b*1 extracts the data when the located symbols are data items. Step 1006*b*2 executes the symbols when the located symbols are instructions.

In some aspects of the invention, processing dynamic instruction sets in Step 1006*b*1 includes additional substeps. Step 1006*b*1*a* uses the run-time engine to capture the length of the patch manager run time instruction. Step 1006*b*1*b* extracts the data items from the patch manager run time instruction, in response to the operation code. Step 1006*b*1*c* uses the extracted data in performing the sequence of operations responsive to the operation code.

Figure 11:
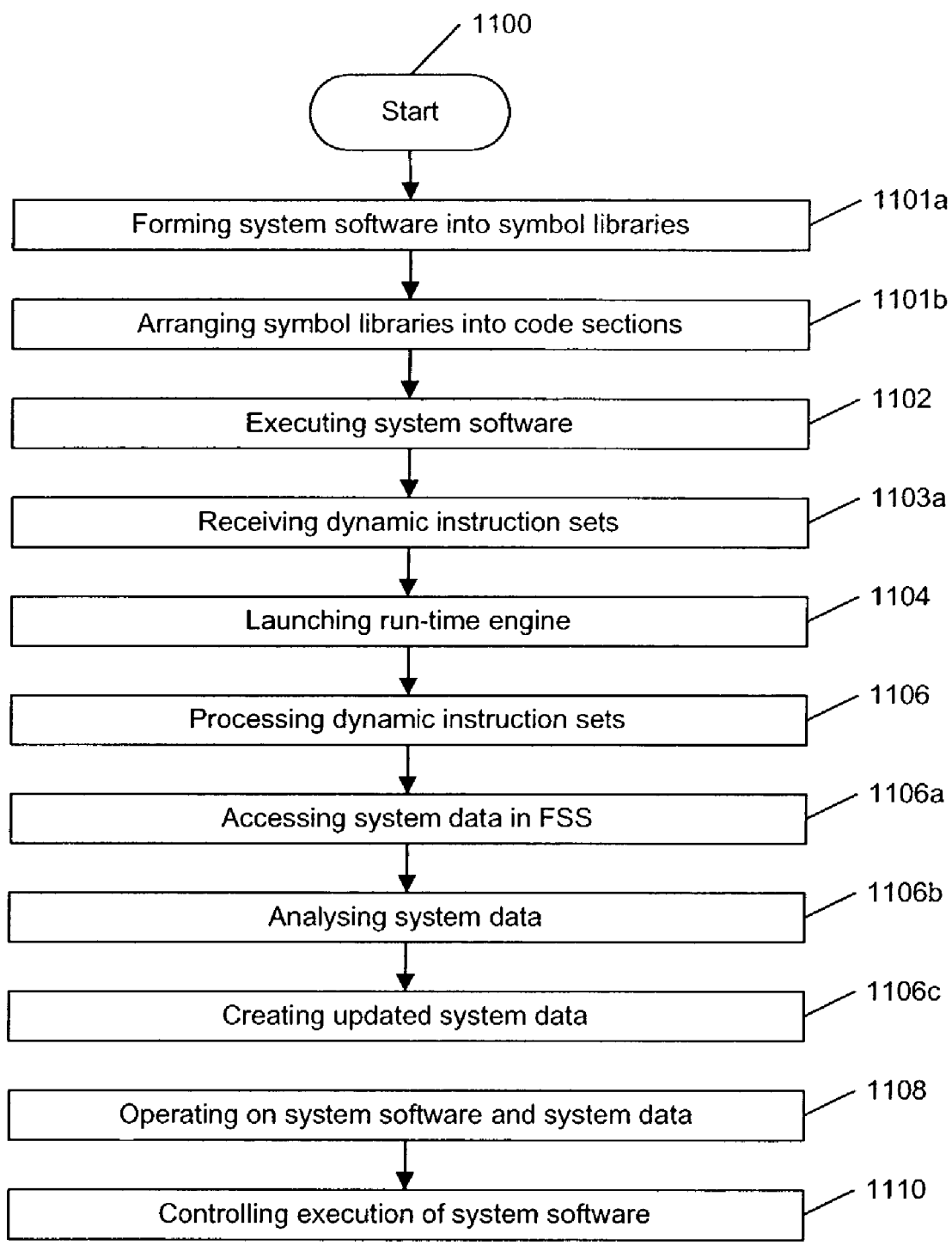
FIG. 11 is a flowchart illustrating an exemplary dynamic instruction set operation.

FIG. 11 is a flowchart illustrating an exemplary dynamic instruction set operation. Several of the Steps in FIG. 11 are the same as in FIG. 10, and are not repeated here in the interest of brevity. Processing dynamic instruction sets in Step 1106 includes substeps. Step 1106*a* accesses system data stored in a second code section in the file system section. Step 1106*b* analyzes the system data. Step 1106*c* creates updated system data. Then, operating on system data and system software in Step 1108 includes replacing the system data in the second section with the updated system data, and controlling the execution of the system software in Step 1010 includes using the updated system data in the execution of the system software.

Figure 12:
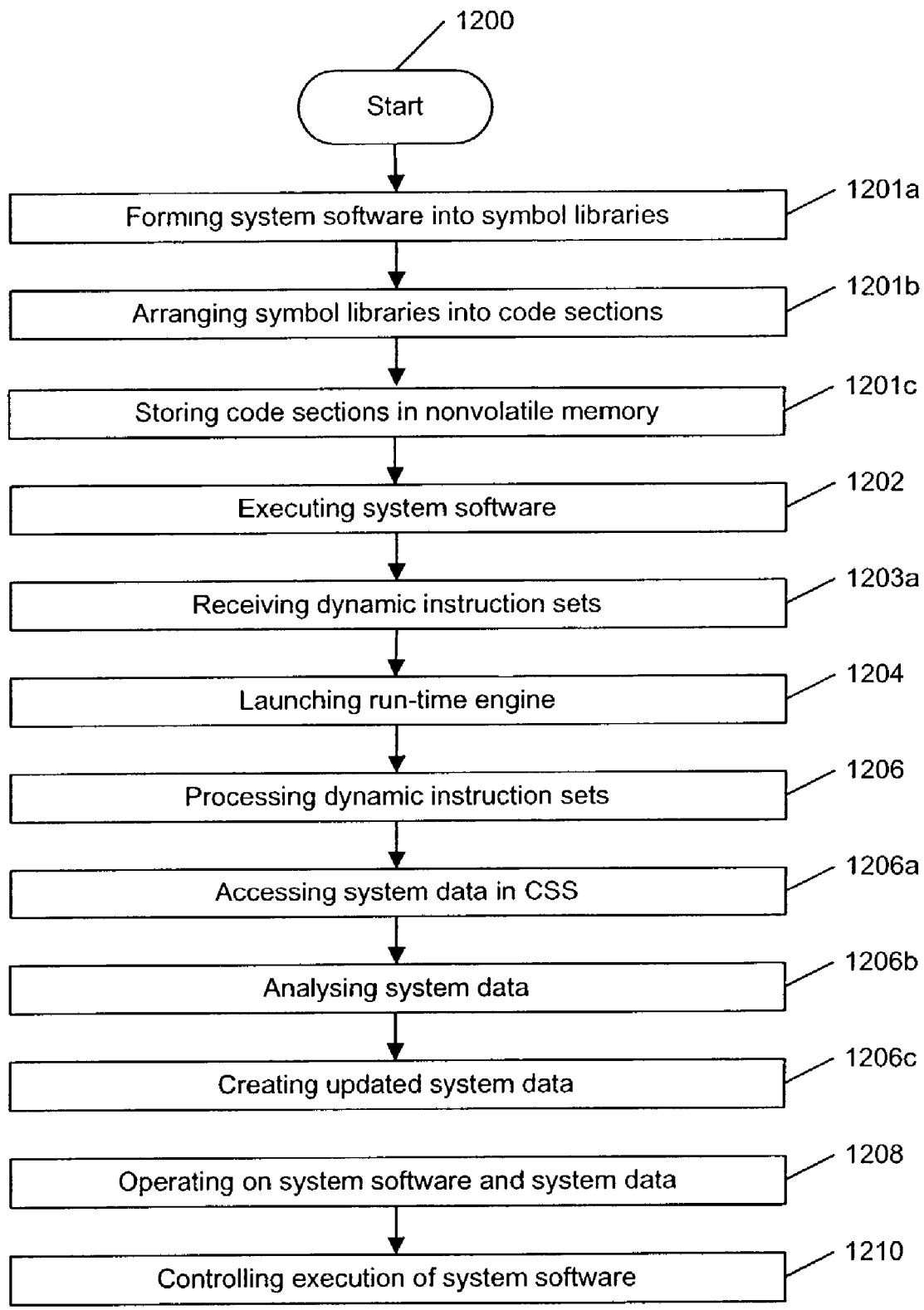
FIG. 12 is a flowchart illustrating another exemplary dynamic instruction set operation.

FIG. 12 is a flowchart illustrating another exemplary dynamic instruction set operation. Several of the Steps in FIG. 12 are the same as in FIG. 10, and are not repeated here in the interest of brevity. Step 1201*c* stores a plurality of code sections in a code storage section nonvolatile memory. Processing dynamic instruction sets in Step 1206 includes substeps. Step 1206*a* accesses system data stored in a third code section in the code storage section (CSS). Step 1206*b* analyzes the system data. Step 1206*c* creates updated system data. Operating on the system data and system software in Step 1208 includes replacing the system data in the third code section with the updated system data. Controlling the execution of the system software in Step 1210 includes using the updated system data in the execution of the system software.

Figure 13:
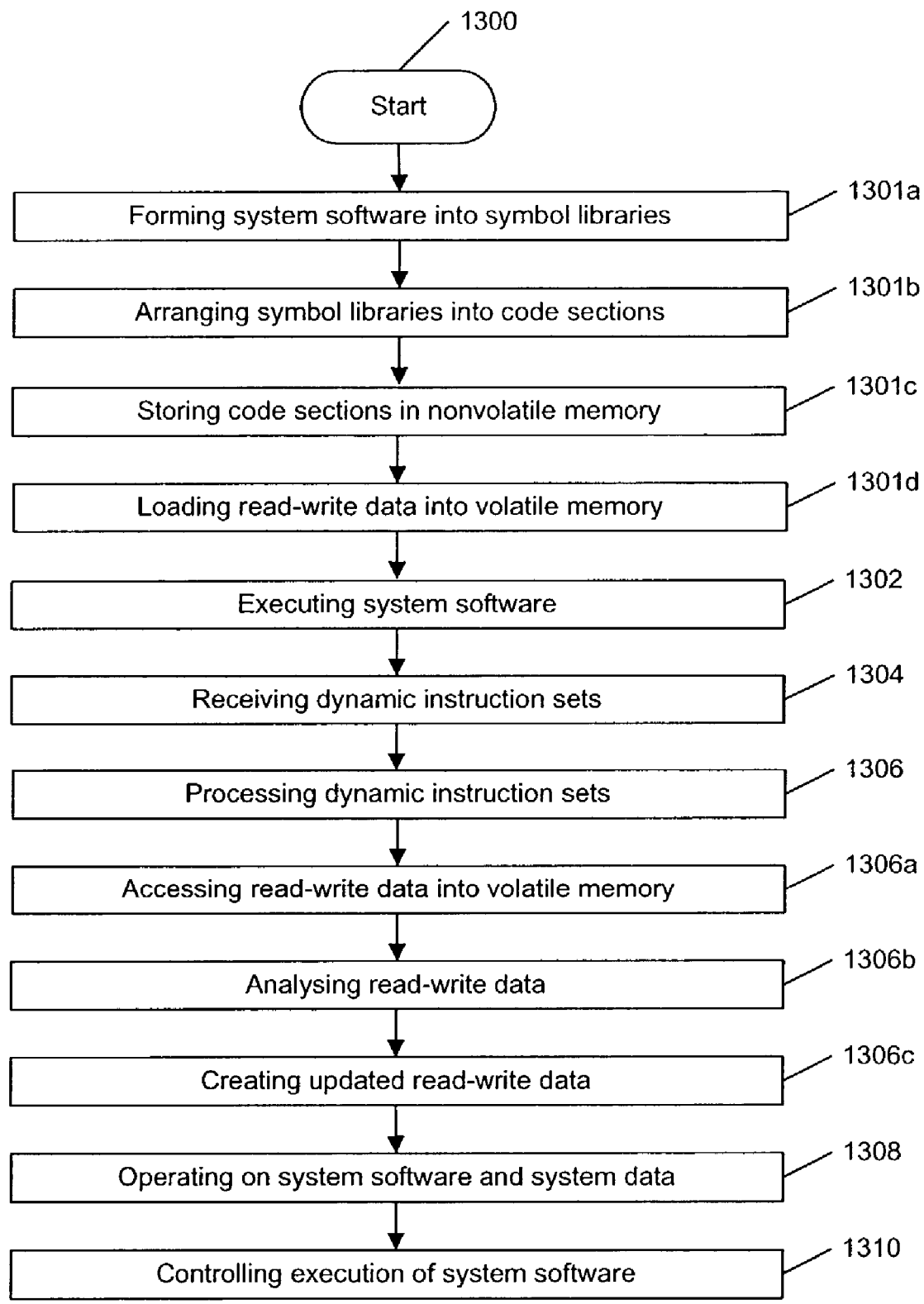
FIG. 13 is a flowchart illustrating a third exemplary dynamic instruction set operation.

FIG. 13 is a flowchart illustrating a third exemplary dynamic instruction set operation. Several of the Steps in FIG. 13 are the same as in FIG. 10, and are not repeated here in the interest of brevity. Step 1301*c* stores a plurality of code sections in a code storage section nonvolatile memory. Step 1301*d* loads read-write data into volatile memory. Processing dynamic instruction sets in Step 1306 includes substeps. Step 1306*a* accesses the read-write data in volatile memory. Step 1306*b* analyzes the read-write data. Step 1306*c* creates updated read-write data. Operating on the system data and system software in Step 1308 includes replacing the read-write data in volatile memory with the updated read-write data. Controlling the execution of the system software includes using the updated read-write data in the execution of the system software.

Figure 14:
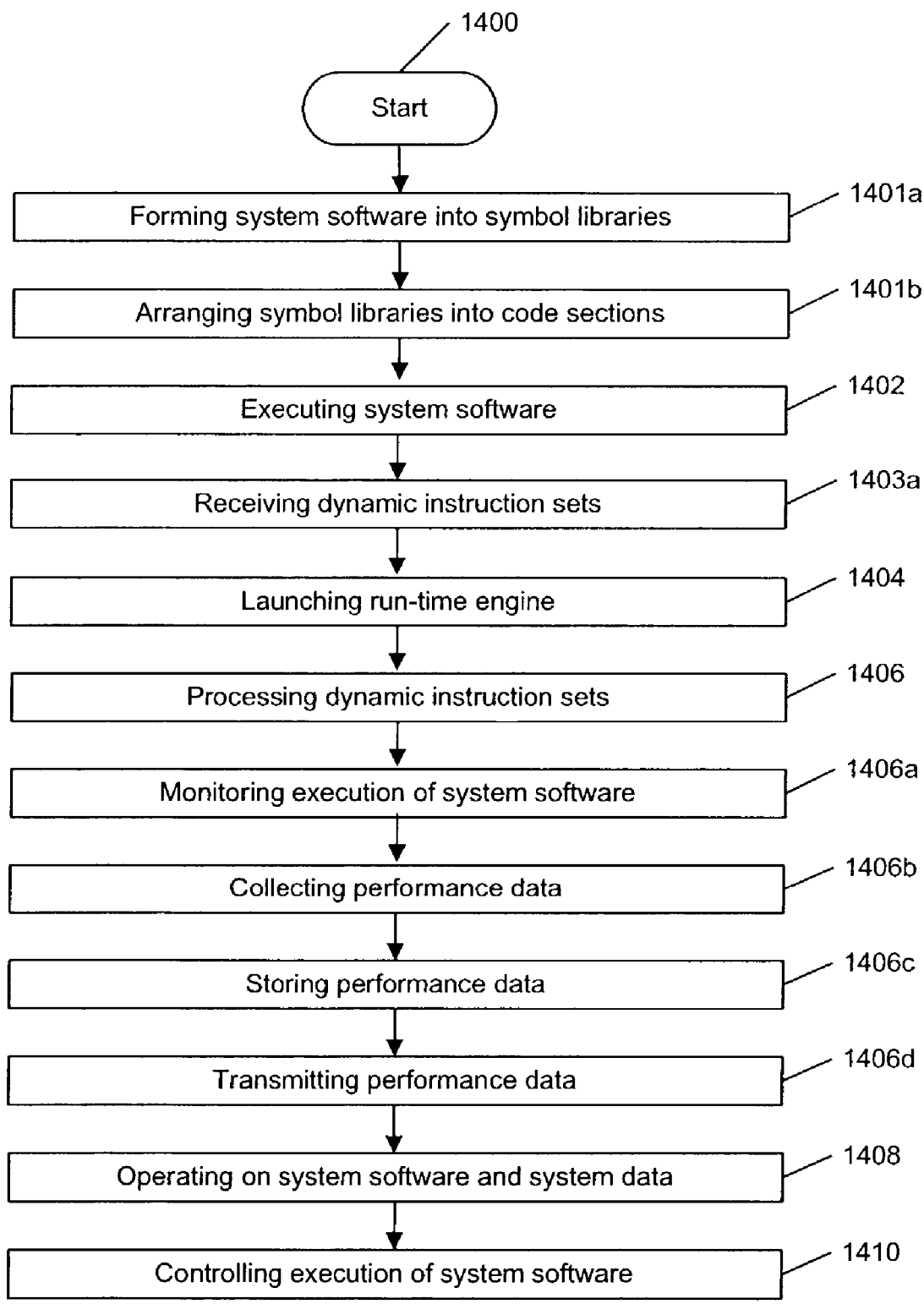
FIG. 14 is a flowchart illustrating a fourth exemplary dynamic instruction set operation.

FIG. 14 is a flowchart illustrating a fourth exemplary dynamic instruction set operation. Several of the Steps in FIG. 14 are the same as in FIG. 10, and are not repeated here in the interest of brevity. Processing dynamic instruction sets includes substeps. Step 1406a, in response to the operation code, monitors the execution of the system software. Step 1406b collects performance data. Step 1406c stores the performance data. Step 1406d transmits the stored data via an airlink interface. Operating on the system data and system software in Step 1408 includes using the performance data in the evaluation of system software.

Figure 15:
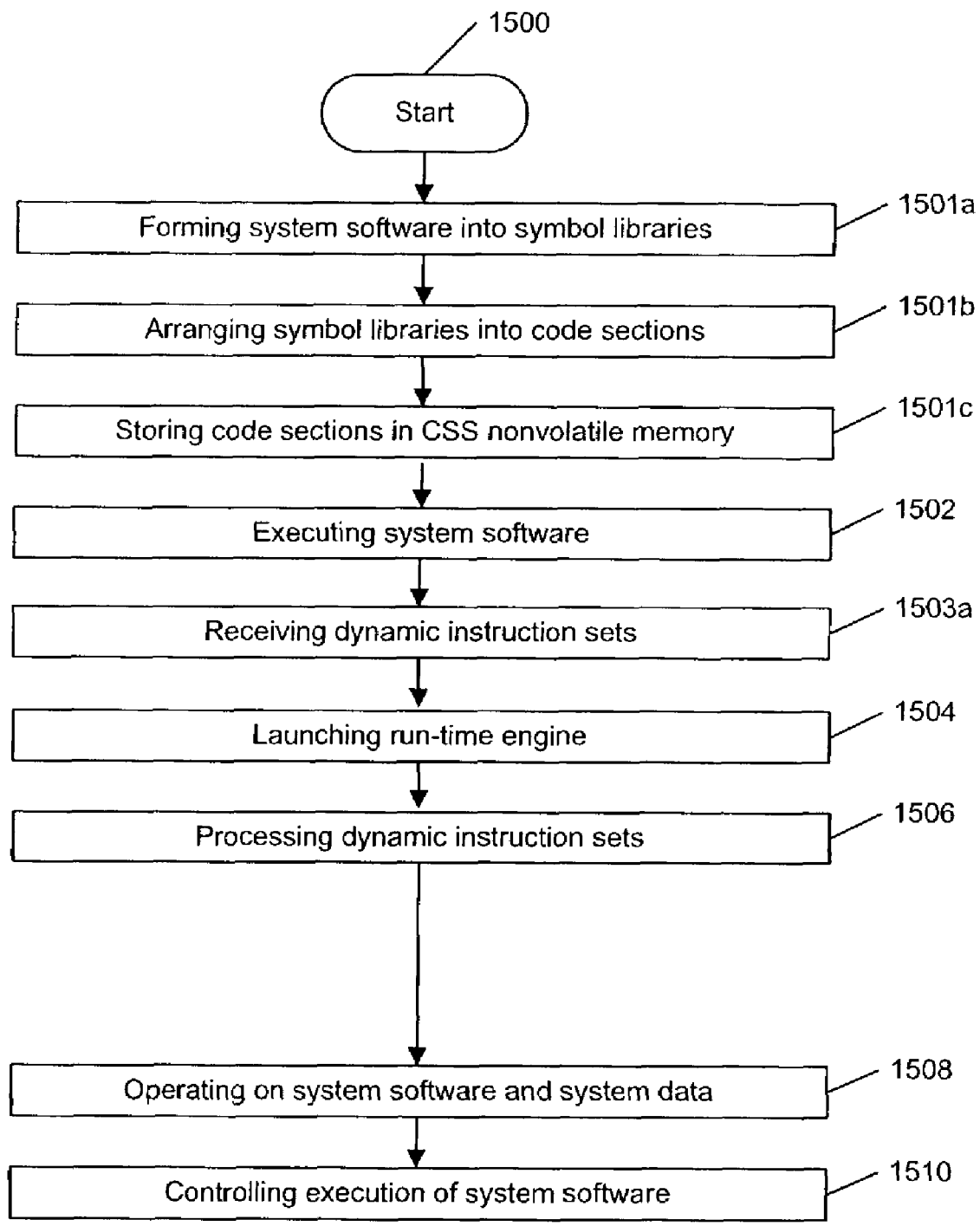
FIG. 15 is a flowchart illustrating a fifth exemplary dynamic instruction set operation.

FIG. 15 is a flowchart illustrating a fifth exemplary dynamic instruction set operation. Several of the Steps in FIG. 15 are the same as in FIG. 10, and are not repeated here in the interest of brevity. Step 1501c stores a plurality of code sections in a code storage section nonvolatile memory. Receiving patch manager run time instructions in Step 1503 includes receiving a new code section. Operating on the system data and system software in Step 1508 includes adding the new code section to the code storage section, and controlling the execution of the system software in Step 1510 includes using the new code section in the execution of the system software.

Alternately, receiving a new code section in Step 1503 includes receiving an updated code section. Then, operating on the system data and system software in Step 1508 includes replacing a fourth code section in the code storage section with the updated code section.

A system and method have been provided for executing dynamic instruction sets in a wireless communications device, so as to aid in the process of updating the software and monitoring the performance of the software. The system is easily updateable because of the arrangement of symbol libraries in code sections, with tables to access the start addresses of the code sections in memory and the offset addresses of symbols in the symbol libraries. The use of dynamic instruction sets permits custom modifications to be performed to each wireless device, based upon specific characteristics of that device. A few general examples have been given illustrating possible uses for the dynamic instructions sets. However, the present invention is not limited to just these examples. Other variations and embodiments of the invention will occur to those skilled in the art.

Figure 16:
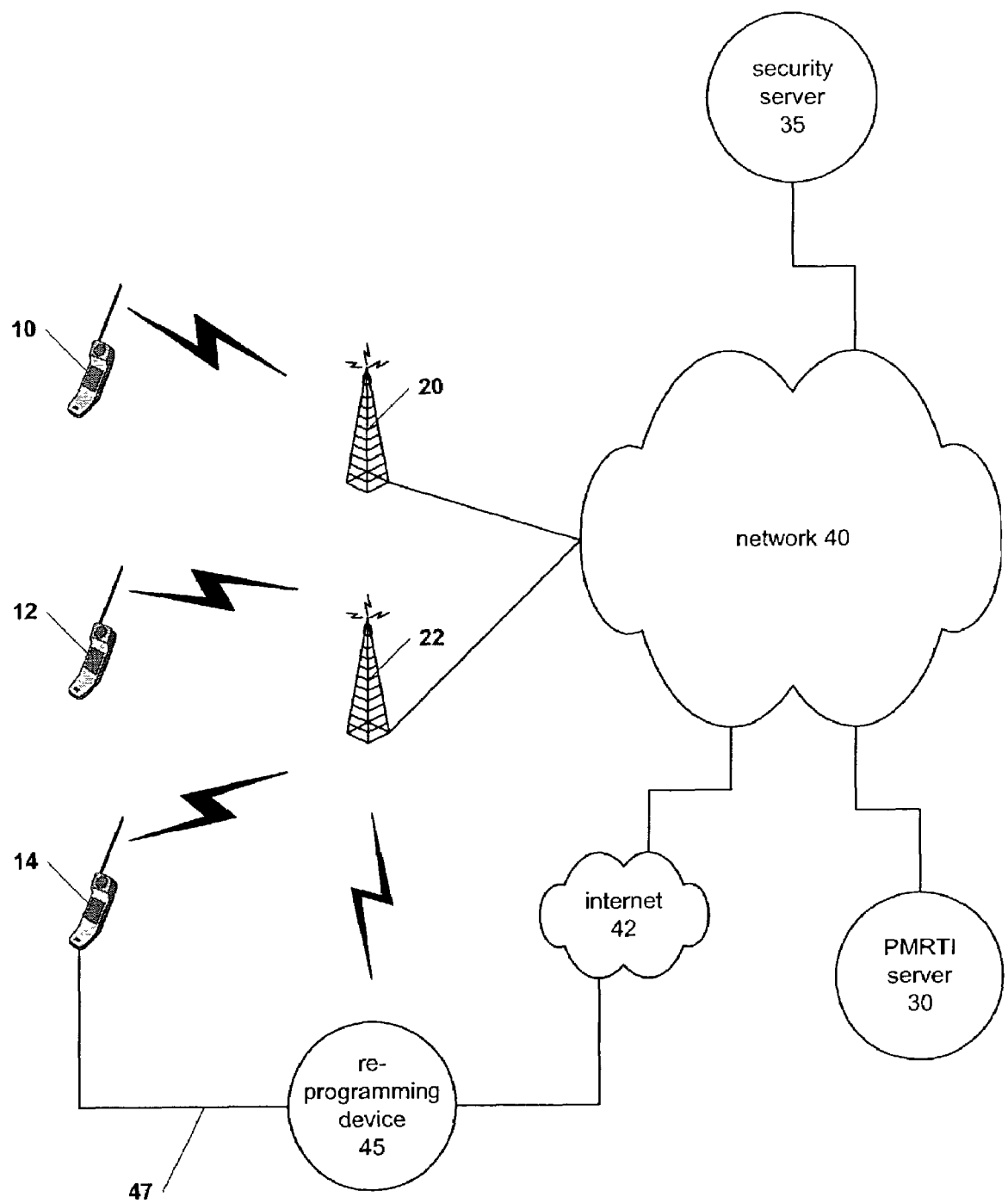
FIG. 16 is a high level network diagram illustrating an example wireless communication network.

FIG. 16 is a high level network diagram illustrating an example wireless communication network in accordance with an embodiment of the present invention. The illustrated wireless communication network comprises a plurality of wireless communication devices 10, 12, and 14; a plurality of base stations 20 and 22; a PMRTI server 30, and a security server 35, each of which are connected to the wireless communication devices 10, 12, and 14 via a network 40.

Also shown in the illustrated embodiment is a reprogramming device 45 that is connected to handset 14 by way of a direct connection 47. Direct connection 47 is a hardwired physical connection between the handset 14 and the reprogramming device 45, for example a serial cable or a wired network connection. Reprogramming device 45 can also be connected to a network such as the internet 42, which may provide the reprogramming device 45 with access to network 40. Additionally, reprogramming device 45 may have a wireless communication ability that allows it to connect with network 40 via a base station such as, for example, base station 22.

Wireless communication device 10 can be any sort of device with the ability to communicate within the wireless communication network. For example, wireless communication device 10 may be a cell phone, a personal digital assistant ("PDA"), a laptop computer, wristwatch, or any other device configured for wireless communication. Wireless communication devices may also be referred to herein as "handsets" or "mobile phones" or "mobile devices".

Base station 20 is preferably configured to communicate over-the-air with a plurality of wireless communication devices and includes a transceiver (not shown) that converts the over-the-air communications to wired communications that travel over network 40. Preferably, network 40 is a private network operated by the wireless carrier. Network 40 preferably provides the infrastructure for handoffs between base stations such as base station 20 and 22. Additionally, network 40 preferably provides the communication link between various application, services, and other computer based servers such as PMRTI server 30 and security server 35.

Network 40 may also server as the conduit for connections to other networks (not pictured) such as an Integrated Services Digital Network ("ISDN"), Public Switched Telephone Network ("PSTN"), Public Land Mobile Network ("PLMN"), Packet Switched Public Data Network ("PSPDN"), and the Internet, just to name a few.

PMRTI server 30 can be implemented as a single computer or as a plurality of servers logically arranged to provide dynamic instruction sets to mobile devices and to execute dynamic instruction sets received from mobile devices. Similarly, security server 35 can be implemented using a general purpose computer with one or more microprocessors, as is well understood in the art. Notably, security server 35 and PMRTI server 30 may be incorporated together on a single physical server machine where they share hardware and system resources. Security server 35 and PMRTI server 30 may also share data files and be communicatively coupled through interprocess communication techniques or physical or wireless connections through network 40.

Figure 17A:
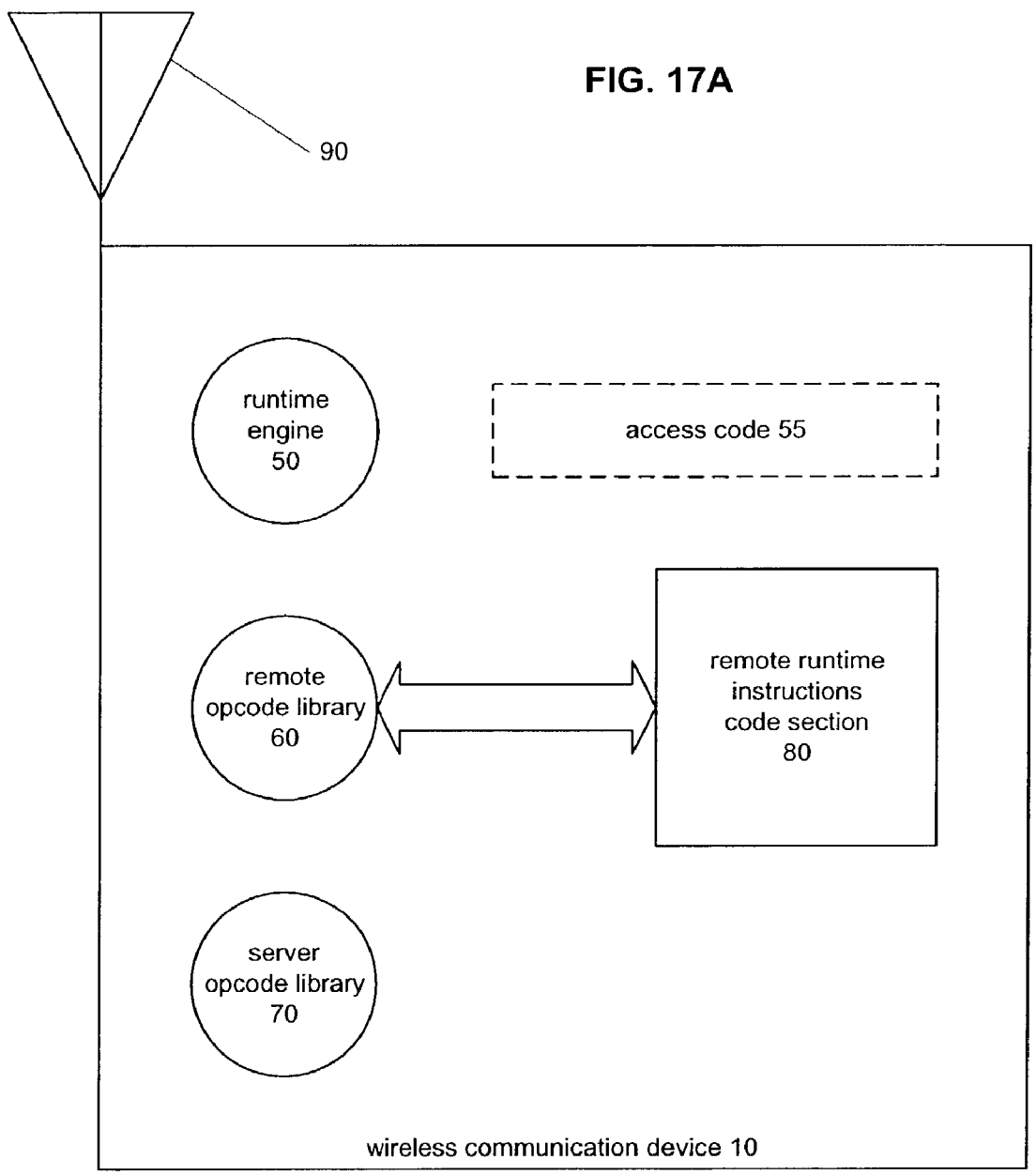
FIG. 17A is block diagram illustrating an example wireless communication device.

FIG. 17A is block diagram illustrating an example wireless communication device 10 according to an embodiment of the present invention. The general features of wireless communication device 10 that allow it to function as such are well known in the art and are therefore not illustrated or described herein.

In one embodiment, handset 10 includes access code 55. Access code 55 is stored in persistent memory on handset 10 where it cannot be modified or deleted. Access code 55 may be an alpha-numeric string, a hexadecimal number, a binary number, or the like. Preferably, access code 55 is a large number or string that is random and very difficult to obtain by illicit reprogramming utilities and tools. In an alternative embodiment, handset 10 does not include access code 55. When no access code is available on handset 10, reprogramming utilities are completely unable to obtain access to the handset in such a manner that would allow for reprogramming. Advantageously, when no access code is present in handset 10, only the carrier can authorize reprogramming. Such an embodiment significantly increases the reprogramming security in the handset.

In one embodiment, access code 55 may contain a flag that directs the handset to query the carrier network for authorization to be reprogrammed. In this way, the carrier can update the flag contained in access code 55 so that the reprogramming security can be turned off, be set for local determination (e.g., when the correct access code is provided), or be set for carrier authorization. Advantageously, this allows the carrier to flexibly control reprogramming security at an individual handset level of granularity.

Handset 10 also includes runtime engine 50, remote operation code ("opcode") library 60, server opcode library 70, and remote runtime instructions code section 80. Runtime engine 50 is preferably configured to process dynamic instructions sets. One example of a dynamic instruction set is a PMRTI instruction set. Another example of a dynamic instruction set is an RPMRTI instruction set. The difference between these two instruction sets is that the PMRTI set includes those functions that can be executed by the wireless device while the RPMRTI instruction set includes those functions that can be executed by the PMRTI server 30 that resides on the network 40.

The processing of dynamic instruction sets includes execution of PMRTI sets that are received from the PMRTI server 30 and the compilation of RPMRTI sets and corresponding data for delivery to the PMRTI server 30. Preferably, runtime engine 50 can be launched by wireless communication device 10 when needed so that it runs only when necessary and consumes a minimal amount of system resources (e.g. memory, CPU cycles, etc.) on the device 10.

Remote opcode library 60 preferably includes the universe of operation codes that represent each PMRTI function or executable code segment. Advantageously, remote opcode library 60 includes the operation codes that serve as place holders for the actual executable machine code functions or code segments. As such, the remote opcode library 60 contains a list of all available operation codes that correspond to each and every PMRTI function that can be executed by the wireless communications device 10.

Similarly, the server opcode library 70 preferably includes the universe of operation codes that represent each RPMRTI function or executable code segment. Advantageously, server opcode library 70 only includes the operation codes for the actual executable machine code functions or code segments, which do not reside on the wireless communication device 10. As such, the server opcode library 70 contains a list of all the operation codes for each available RPMRTI function that can be executed by the PMRTI server 30 on behalf of the wireless communication device 10.

In the preferred embodiment, the number of available RPMRTI functions can well exceed the number of available PMRTI functions because the PMRTI server 30 does not suffer from the minimal resources typically found on mobile devices such as cell phones and PDAs.

Figure 17B:
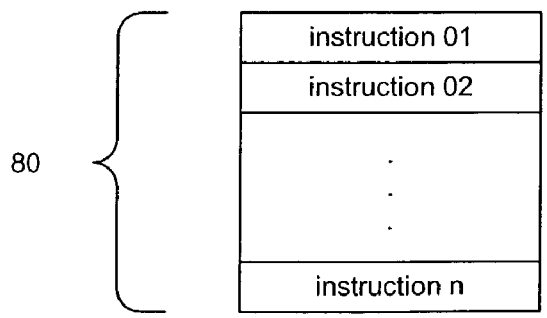
FIG. 17B is block diagram illustrating an example remote runtime instructions code section.

Additionally, wireless communication device 10 includes remote runtime instructions code section 80. The code section 80 is where the actual machine code or executable instructions reside in persistent memory on the device 10. These executable instructions or code segments preferably correspond in a one-to-one relationship with the opcodes contained in the remote opcode library 60. FIG. 17B is block diagram illustrating an example code section 80 according to an embodiment of the present invention. As shown, any number of PMRTI functions can be included in code section 80, from instruction 01 through instruction n. Optimally, a large number of functions are available in code section 80 and yet consume very little resources (e.g. persistent memory) of the device 10.

Advantageously, the server opcode library 70, the remote opcode library 60, and the corresponding code section 80 can be installed in persistent memory on the wireless communication device 10 during manufacture of the device 10 and prior to its deployment in the field (i.e., prior to being sold to the consumer). Future updates to the set of opcodes contained in either library or to the set of executable instructions in the code section 80 can be provided by the PMRTI server 30 implementing the process later described with respect to FIG. 22.

Finally, in the illustrated embodiment, wireless communication device includes an over-the-air communication link 90. Implementation of the communication link 90 is well known in the art and provides the wireless communication device 10 with the ability to communicate within the wireless communication network 100 via a radio or other over-the-air connection. Advantageously, over-the-air communication link 90 can provide the means for PMRTI server 30 to update remote opcode library 60, server opcode library 70, and remote runtime instructions codes section 80.

Figure 18A:
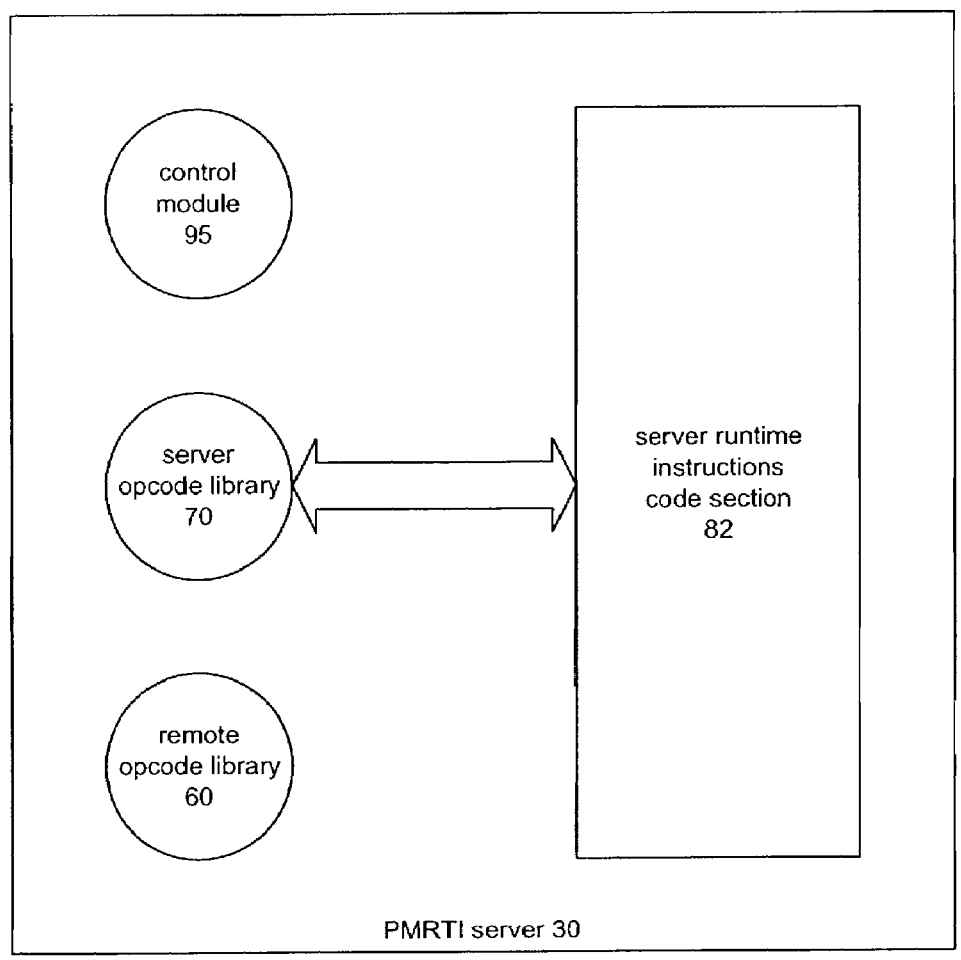
FIG. 18A is a block diagram illustrating an example PMRTI server.

FIG. 18A is a block diagram illustrating an example PMRTI server 30 according to an embodiment of the present invention. The features of a general purpose computer that may implement the PMRTI server are later described with respect to FIG. 23.

In the illustrated embodiment, PMRTI server 30 includes control module 95, remote opcode library 60, server opcode library 70, and server runtime instructions code section 82. The remote opcode library 60 and server opcode library 70 preferably contain the same list of opcodes as the libraries that are present on the wireless communication device 10. The control module 95 is preferably configured to process dynamic instructions sets and manage a network of PMRTI communications between the PMRTI server 30 and a plurality of wireless communication devices available via the wireless communication network.

For example, the control module 95 may compile various dynamic PMRTI sets and send those instruction sets to a variety of discrete wireless communication devices. Similarly, the control module 95 may also receive a plurality of dynamic RPMRTI sets and execute those instruction sets on behalf of the sending wireless communication device.

Remote opcode library 60 preferably includes the universe of operation codes corresponding to each available PMRTI function or executable code segment. Advantageously, remote opcode library 60 comprises a list of the operation codes that serve as place holders for the actual executable machine code functions or code segments in the remote runtime instructions code section 80 (on the wireless communication device). As such, the remote opcode library 60 contains a list of all available opcodes for all available PMRTI functions that can be executed by a wireless communications device.

Similarly, the server opcode library 70 preferably includes the universe of operation codes corresponding to each RPMRTI function or executable code segment. Advantageously, server opcode library 70 only includes the operation codes for the actual executable machine code functions or code segments that can be carried out the PMRTI server 30. In the preferred embodiment, the number of available RPMRTI functions can well exceed the number of available PMRTI functions because the PMRTI server 30 does not suffer from the minimal resources typically found on mobile devices such as cell phones and PDAs.

Figure 18B:
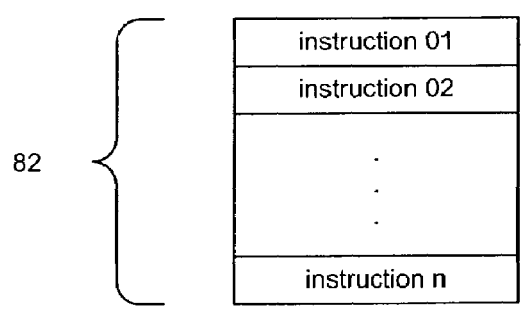
FIG. 18B is block diagram illustrating an example server runtime instructions code section.

Additionally, PMRTI server 30 includes the server runtime instructions code section 82. The code section 82 is where the actual machine code or executable instructions reside in persistent memory on the server 30. These executable instructions or code segments preferably correspond in a one-to-one relationship with the operation codes contained in the server opcode library 70, which resides both on the server 30 and the wireless communication device 10. FIG. 18B is block diagram illustrating an example server runtime instructions code section according to an embodiment of the present invention.

Figure 19:
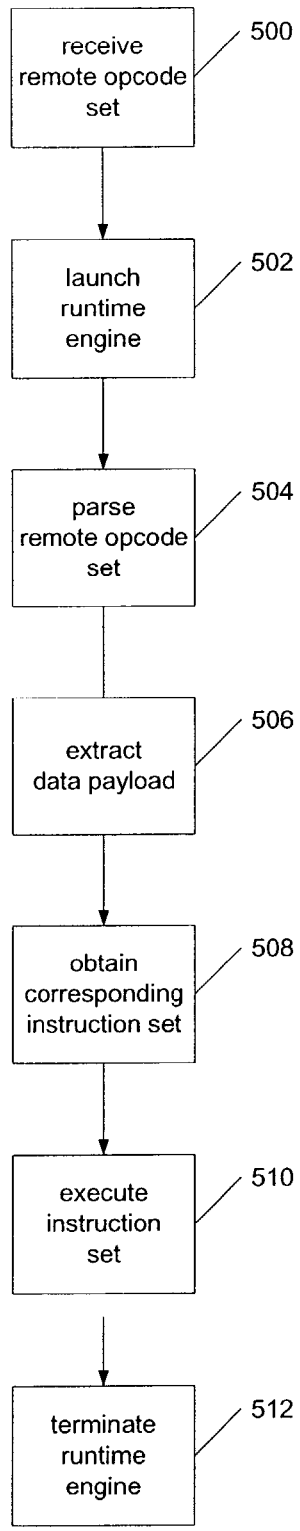
FIG. 19 is a flow diagram illustrating an example process for executing dynamic instruction sets on a wireless communication device.

FIG. 19 is a flow diagram illustrating an example process for executing dynamic instruction sets on a wireless communication device according to an embodiment of the present invention. Initially, in step 500, the wireless device receives a set of remote opcodes. The set of remote opcodes can be received via an over-the-air communication link, for example a link with a wireless communication network. Preferably, the opcodes are optimized to minimize the amount of data sent over-the-air. Additionally, a data payload may be included with the set of opcodes received by the wireless device.

In step 502, the wireless device launches its runtime engine to process the remote opcode set. As illustrated in step 504, the runtime engine parses the remote opcode set and then extracts the data payload in step 506. If no data payload exists, then this step can be skipped. If a data payload does exist, then the resulting data can be stored in an available portion of volatile memory for later use. Next, the runtime engine obtains the executable instructions that correspond to the opcodes in the remote opcode set as shown in step 508. These instructions can be obtained from the remote runtime instructions code section of the wireless device.

Once the executable instructions corresponding to the opcodes in the remote opcode set have been obtained, the runtime engine executes the instructions, as illustrated in step 510. When the instructions are being executed, any necessary data to be operated on can be obtained from volatile memory where the data payload is stored. Alternatively, or additionally, any necessary data to be operated on may be obtained as the result of an executed instruction.

For example, the data payload may include an updated software module for the wireless device. Additionally, one of the opcodes in the remote opcode set may correspond to an executable instruction for replacing a section of persistent memory with a portion of the data payload. In this example, the portion of persistent memory being replaced is the outdated software module and as a result the updated software module is loaded into persistent memory by the instruction. Thus, the remote opcode set and data payload operate on the wireless device to update a software module.

Once the instruction set has been executed in its entirety by the runtime engine, the runtime engine can be terminated, as shown in step 512. Advantageously, the runtime engine may be launched and terminated so that it only runs when necessary. This saves system resources on the wireless device, for example it may save volatile memory space and CPU cycles.

Figure 20:
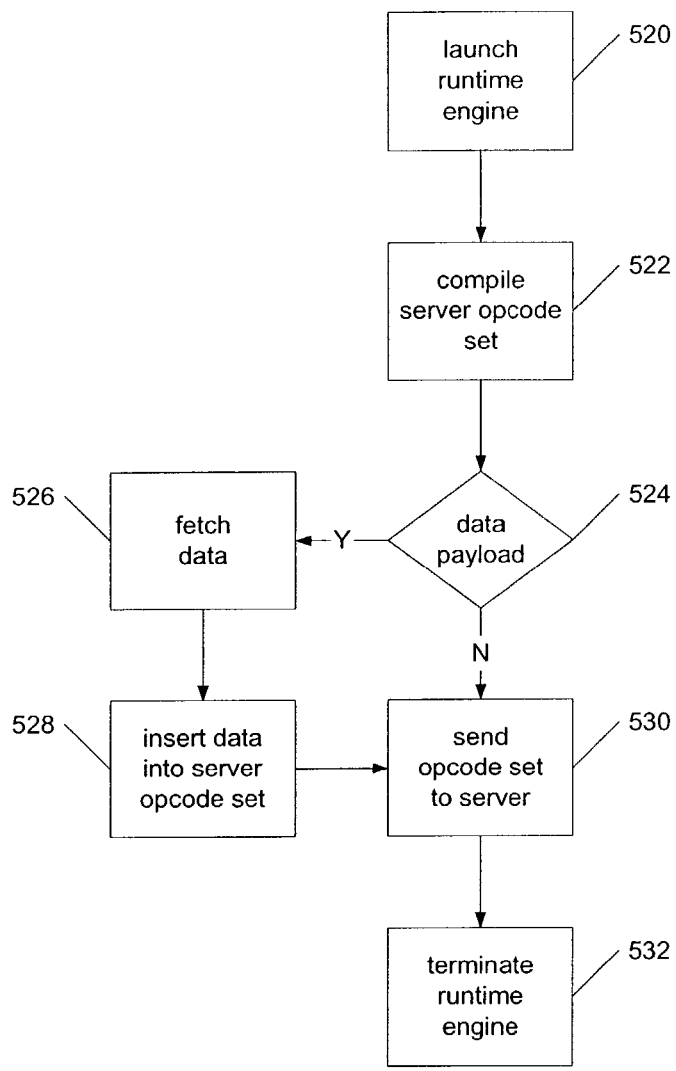
FIG. 20 is a flow diagram illustrating an example process for compiling dynamic instruction sets on a wireless communication device.

FIG. 20 is a flow diagram illustrating an example process for compiling dynamic instruction sets on a wireless communication device according to an embodiment of the present invention. Initially, the runtime engine is launched, as illustrated in step 520. Once the runtime engine is running, the engine can compile a set of server opcodes, as shown in step 522. The set of server opcodes may be obtained from a background process running on the wireless device. Alternatively, the server opcode set may be obtained from a process running on the wireless device under the direction of a user.

For example, the wireless device may include a set of routines that are periodically and automatically run by the operating system in order to perform system maintenance or other desirable functions. These procedures may, as a result of their execution, cause a server opcode set to be generated by the runtime engine. Alternatively, a user may initiate a particular set of routines that are only executed when requested by a user. This set of routines may also cause a server opcode set to be generated by the runtime engine. In both cases, the result is a server opcode set generated by the runtime engine, as shown in step 522.

Once the server opcode set has been generated, the runtime engine determines in step 524 if a data payload should accompany the server opcode set. If there is data that needs to go along with the server opcode set, in step 526 the runtime engine fetches the data from persistent or volatile memory, or executes an instruction that returns the data needed. Once the data has been obtained, the run time engine next inserts the data into the server opcode set, as illustrated in step 528. One simple way to achieve this is to append the data payload to the server opcode set in a single data packet.

Once the data payload has been combined with the server opcode set, or if no data payload is required, then the runtime engine sends the server opcode set (with or without a data payload) to the server, as shown in step 530. After the server opcode set has been sent, the runtime engine may be terminated to free up resources on the wireless device, as illustrated in step 532.

Figure 21:
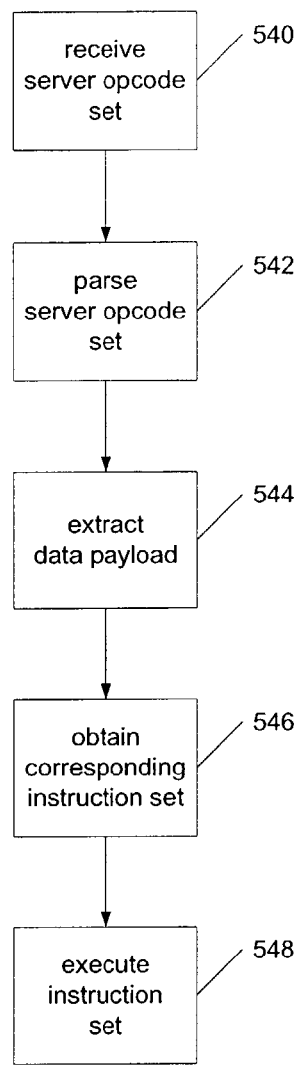
FIG. 21 is a flow diagram illustrating an example process for executing dynamic instruction sets on a PMRTI server.

FIG. 21 is a flow diagram illustrating an example process for executing dynamic instruction sets on a PMRTI server according to an embodiment of the present invention. Initially, in step 540 the server receives the server opcode set. The opcode set is preferably a list of monikers that represent a series of executable instructions, with each opcode representing a discrete executable instruction or a discrete set of executable instructions. Once the set of server opcodes has been received, the server then parses the server opcode set in step 542 and extracts any data payload included with the server opcode set, as illustrated in step 544. When the data payload is extracted, it may be temporarily stored in volatile memory on the server for later use.

Next, the server obtains the corresponding instruction set, as shown in step 546. Preferably, the corresponding instruction set is stored in a server runtime instructions code section that resides in persistent memory on the PMRTI server machine. Once the instruction set has been obtained, the server then executes the instruction set, as seen in step 548. When the instruction set is being executed, the executing routines may use the data payload that came with the server opcode set. Preferably, the data payload is stored in memory on the server for this purpose. Alternatively, the executing routines may include instructions that generate the data necessary for the instruction set to carry out its function.

Figure 22:
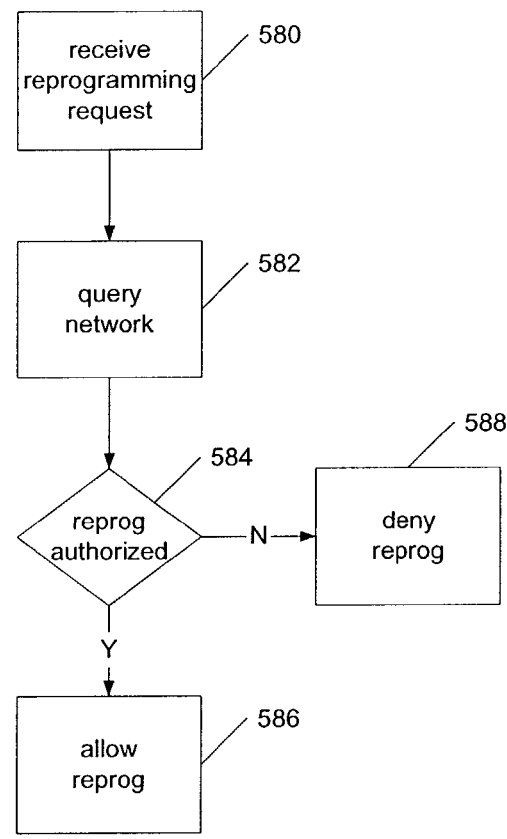
FIG. 22 is a flow diagram illustrating an example process for carrier authorization of handset reprogramming.

FIG. 22 is a flow diagram illustrating an example process for carrier authorization of handset reprogramming. Initially, in step 580, the handset receives a reprogramming request from a reprogramming device. The device may be connected to the handset via a direct serial cable or a local physical network connection. The device may also be connected to a plurality of handsets via a local network connection or a one-to-many serial cable connection that allows the reprogramming device to work with multiple handsets.

Once the handset receives the reprogramming request, reprogramming attempt, or an attempt to determine the handset's access code, the handset sends a query to the carrier via a wireless communication means, as shown in step 582. This request is sent to determine if the reprogramming of the handset is authorized by the carrier. When the handset receives a response from the carrier via the same wireless communication means, the handset determines if the reprogramming is authorized, as shown in step 584. If the reprogramming is authorized, in step 586 the handset allows the reprogramming, for example by providing the reprogramming device with the access code, if one exists.

If the reprogramming is not authorized, the handset denies the reprogramming request, as illustrated in step 588. Advantageously, the carried can log the request. Additionally, the carrier can query the handset for location information such as GPS in order to determine the location where the reprogramming attempt was made. This information may be helpful if the reprogramming attempt was unauthorized.

Figure 23:
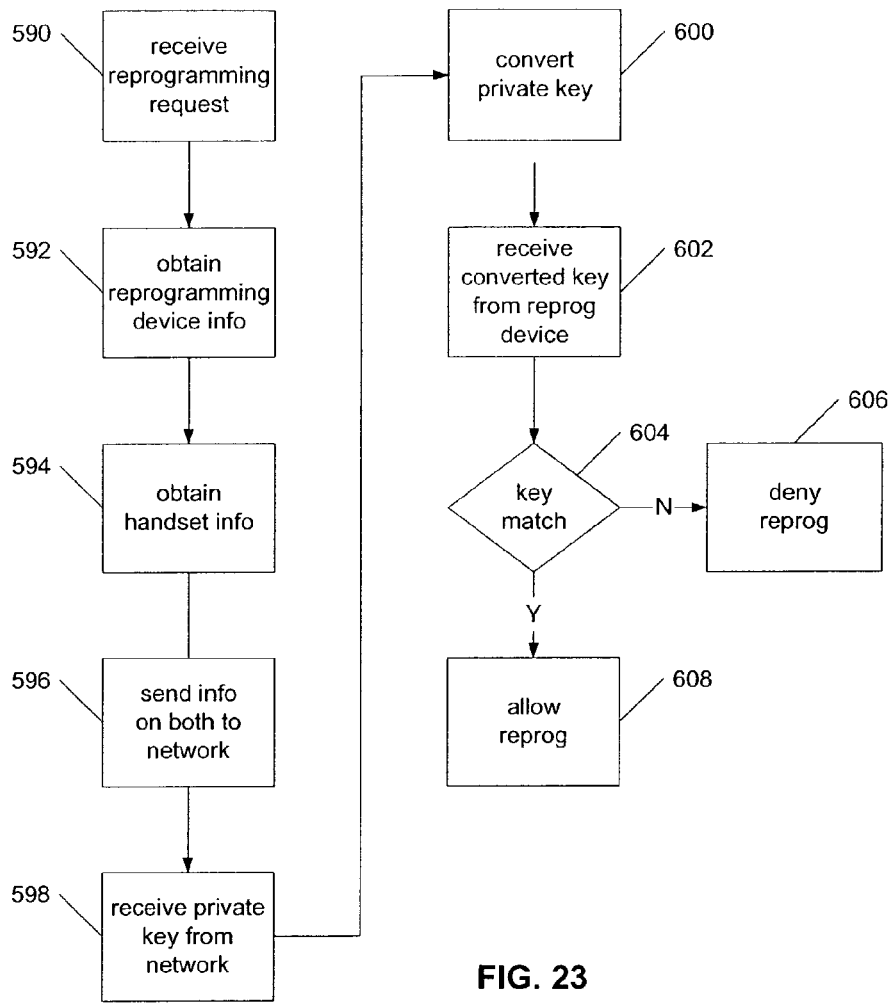
FIG. 23 is a flow diagram illustrating an example public and private key process for carrier authorization of handset reprogramming.

FIG. 23 is a flow diagram illustrating an example public and private key process for carrier authorization of handset reprogramming. Initially, in step 590 the handset receives a reprogramming request. Next, the handset obtains as much information about the reprogramming device as possible. For example, the handset may obtain the reprogramming device's IP address or MIN, if the device is wireless enabled. Additional information may also be obtained.

In step 594, the handset obtains its own information such as its MIN and ESN and other information required by the carrier for identification of the handset. Once the information has been gathered, the handset sends the information to the carrier, as illustrated instep 596. This information can be delivered to the security server on the wireless network for processing. After sending the information, the handset receives a private key from the carrier, as shown in step 598. The handset then converts the private key using its own public key in step 600 and then receives a key from the reprogramming device in step 602. The handset then proceeds to compare the converted key with the key from the reprogramming device to see if they match, as illustrated in step 604. If the keys match, then authorization is provided for reprogramming, as shown in step 608. If the keys do not match, however, then in step 606 the handset denies the reprogramming request.

In the above described process (from the point of view of the handset) it is important to point out that the carrier uses the reprogramming device information to contact the reprogramming device and send the carrier's private key to the reprogramming device similar to the carrier sending its private key to the handset in step 598. The private key is the genesis of any key conversion by the reprogramming device and therefore the reprogramming device must obtain the private key so it can be converted and sent to the handset for comparison. If the reprogramming device is unable to receive the private key and convert it and send the converted key to the handset, the handset may be configured to time out and deny the reprogramming request.

Figure 24:
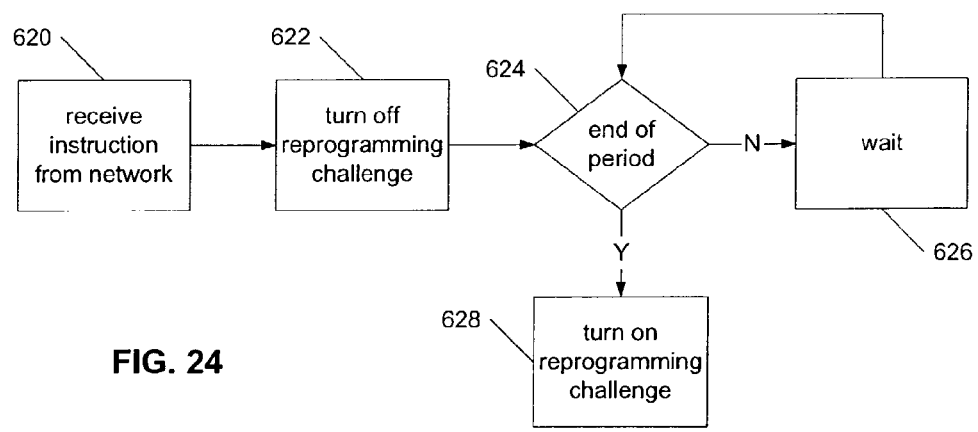
FIG. 24 is a flow diagram illustrating an example process for creating an authorization free reprogramming window on a handset.

FIG. 24 is a flow diagram illustrating an example process for creating an authorization free reprogramming window on a handset. In an embodiment where a carrier has a large stock of phones that need to be reprogrammed, the carrier may opt to turn off the reprogramming security procedures for a predetermined interval of time. For example, a 6 hour window may be devised to allow a service provide to reprogram a block of handsets.

Initially, the carrier sends out an instruction to a group of handsets, or alternatively a single handset. Such an instruction can be delivered by the PMRTI server using the previously described remote opcode set. In step 620, the handset receives this instruction from the carrier. The instruction tells the handset to turn off the reprogramming security procedures during a specific window of time. The instruction may also tell the handset to turn off the reprogramming security procedures indefinitely. Alternatively, the instruction may tell the handset to turn on the security procedures. In this case, the instruction tells the handset to turn off the security procedures for a 6 hour window, beginning immediately.

In step 622, the handset turns off the reprogramming security features. The handset then periodically checks to see if the end of the predetermined period has been reached, as illustrated in step 624. If the period is still in effect, the handset continues to wait, as shown in step 626. The waiting period between each check may be set at a small interval, a large interval, or a variable interval determined by how close it is to turning the reprogramming security features back on.

Figure 25:
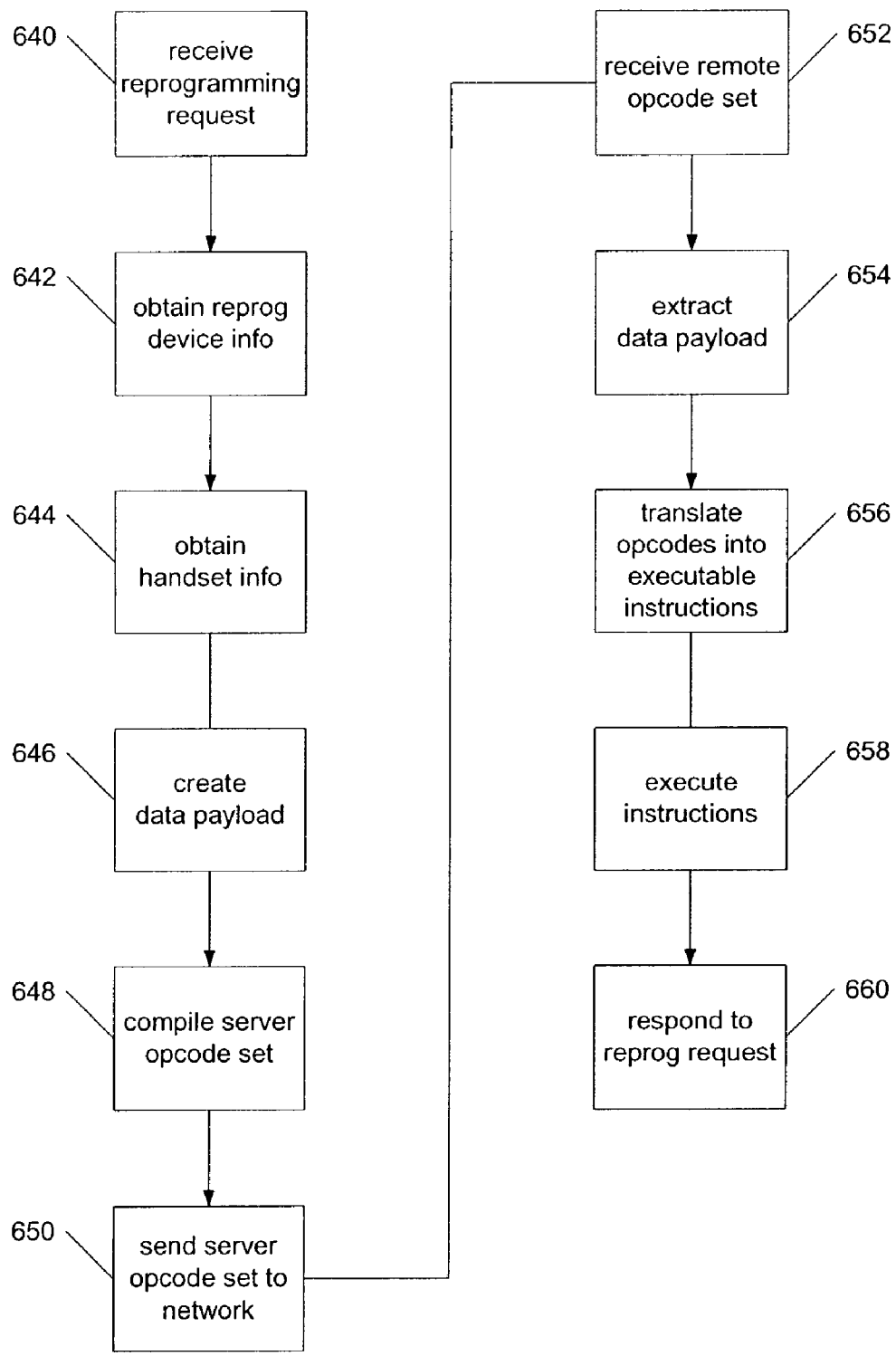
FIG. 25 is a flow diagram illustrating an example PMRTI process for carrier authorization of handset reprogramming.

FIG. 25 is a flow diagram illustrating an example PMRTI process for carrier authorization of handset reprogramming. Initially, the handset receives a reprogramming request, as seen in step 640. Upon receiving such a request, the handset obtains information from the reprogramming device, as shown in step 642. This information may include a software identification number (to validate the reprogramming utility), a MIN, or other unique identifiers for the reprogramming device or the software utility or tool being used by the reprogramming device.

In step 644, the handset obtains its own identification information such as its MIN, ESN and other useful or helpful information such as its location. Once the handset and reprogramming device information has been obtained, in step 646 the handset creates a data payload including this information. Additional information may also be provided. Next, in step 648, the handset compiles a server opcode set including the data payload and a server opcode representing an instruction for the server to authorize the reprogramming. This server opcode set is then sent to the carrier in step 650 where it is delivered first to the PMRTI server and then to the security server. These two servers can be housed in the same machine and even run as a single combined software application.

After the server opcode set is processed by the carrier, the handset receives a remote opcode set from the carrier, as seen in step 652. Upon receipt of the remote opcode set, the handset extracts the data payload in step 654 and then translates the remote opcodes in the set into executable instructions, as illustrated instep 656. The handset executes these instructions in step 658 to determine whether authorization has been provided by the carrier. The authorization or denial from the carrier can be included in the data payload, with an instruction that unpacks the response from data payload and delivers the response to the handset operating system or utility that is in communication with the reprogramming device. Once the handset has its authorization or denial from the carrier, the handset responds to the reprogramming device in an affirmative or negative fashion accordingly.

On the server side, the carrier preferably logs each reprogramming request from a handset. Additionally, the carrier can maintain statistics on successful and unsuccessful reprogramming attempts. Furthermore, the carrier can authorize reprogramming based on the information provided that pertains to the reprogramming device. Also, the carrier may authorize a partial reprogramming of the handset. For example, this may be advantageous when older handsets are donated to shelters or other organizations. These handsets may be reprogrammed for certain types of network access while keeping the handset's original MIN.

Figure 26:
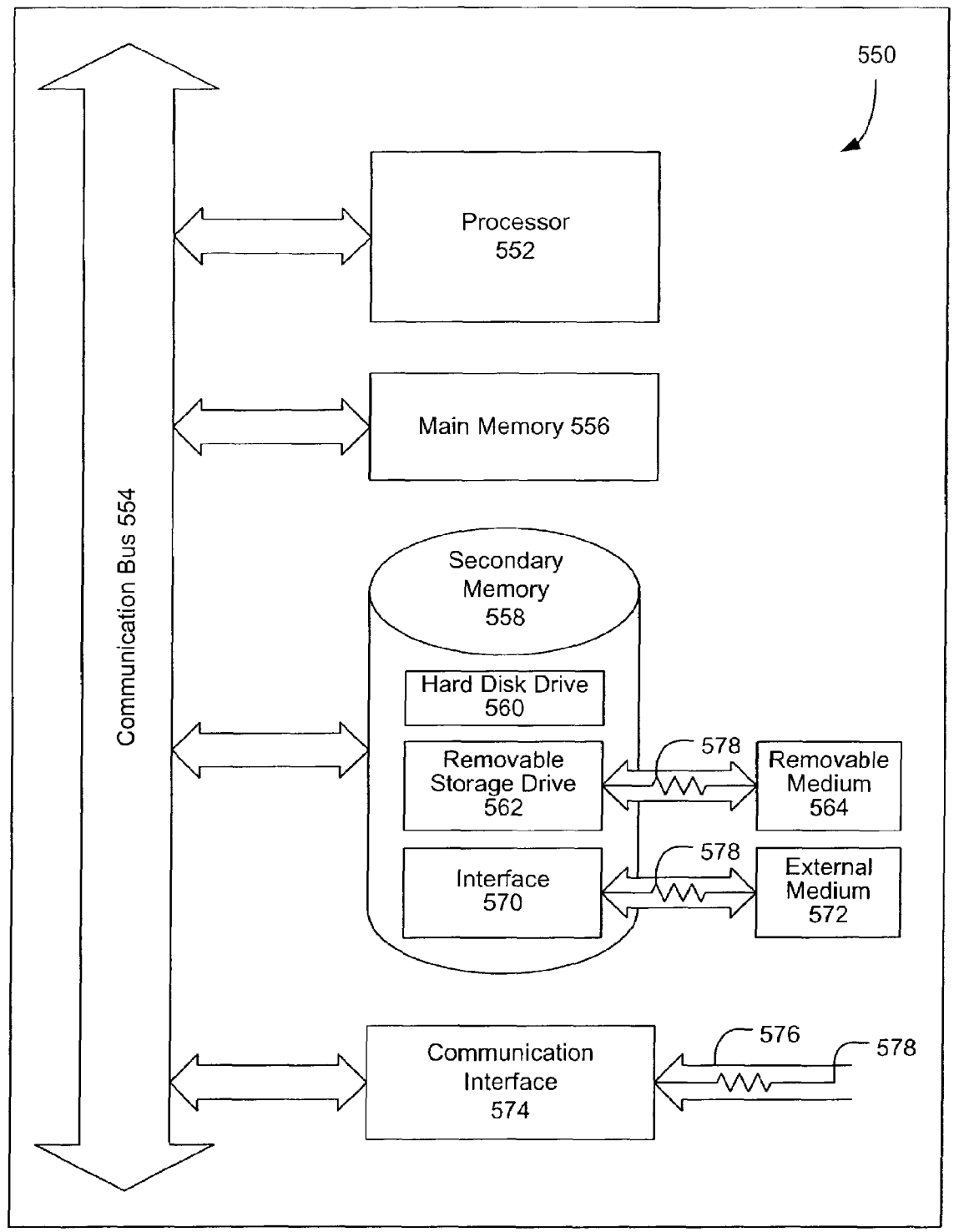
FIG. 26 is a block diagram illustrating an exemplary computer system that may be used in connection with various embodiments described herein.

FIG. 26 is a block diagram illustrating an exemplary computer system 550 that may be used in connection with the various examples described herein. For example, the computer system 550 may be employed as the PMRTI server or the security server that resides within the wireless communication network. Computer system 550 may also be employed as any of the various other general or specific purpose computer systems that comprise the wireless communication network and its constituent components. However, other computer systems and architectures may be used, as will be clear to those skilled in the art.

The computer system 550 preferably includes one or more processors, such as processor 552. Additional processors may be provided, such as an auxiliary processor to manage input and output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of communication means including wire or cable, fiber optics, conventional phone line, cellular phone link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various examples may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various examples may also be implemented using a combination of both hardware and software.

While the particular systems and methods herein shown and described in detail are fully capable of attaining the above described objects of this invention, it is to be understood that the description and drawings presented herein are representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A method for improved security in reprogramming wireless communication devices, the method comprising the steps of:
   receiving a reprogramming authorization request from a reprogrammable wireless communication device in communication with a reprogramming device, the reprogramming authorization request including contact information for the reprogramming device and requesting authorization to be reprogrammed by the reprogramming device and having a unique identifier for the requesting reprogrammable wireless communication device and further where the reprogramming authorization request is generated by the reprogrammable wireless communication device;
   consulting a data storage area for reprogramming information pertaining to the reprogrammable wireless communication device;
   determining the current programming status of the reprogrammable wireless communication device;
   sending a reprogramming authorization response, the reprogramming authorization response based on a calculation, to the reprogrammable wireless communication device based on the current programming status;
   sending a private key to the reprogrammable wireless communication device; and
   sending the private key to the reprogramming device, wherein the private keys are converted by the respective devices and compared to determine the reprogramming authorization response.

2. The method of claim 1, wherein the authorization response denies reprogramming.

3. The method of claim 1, wherein the authorization response allows reprogramming.

4. The method of claim 1, wherein the authorization response allows partial reprogramming.

5. The method of claim 1, further comprising the steps of:
   storing the authorization request and the authorization response in the data storage area; and
   associating the authorization request and the authorization response with the requesting reprogrammable wireless communication device.

6. A computer readable medium having stored thereon one or more sequences of instructions for causing one or more microprocessors to perform the steps for improved security in reprogramming wireless communication devices, the steps comprising:
   receiving a reprogramming authorization request from a reprogrammable wireless communication device, the reprogramming authorization request including contact information for the reprogramming device and requesting authorization to be reprogrammed by the reprogramming device and having a unique identifier for the requesting reprogrammable wireless communication device and further where the reprogramming authorization request is generated by the reprogrammable wireless communication device;
   consulting a data storage area for reprogramming information pertaining to the reprogrammable wireless communication device;
   determining the current programming status of the reprogrammable wireless communication device;
   sending a reprogramming authorization response to the reprogrammable wireless communication device based on the current programming status and where the reprogramming authorization response is based on a calculations;
   sending a private key to the reprogrammable wireless communication device; and
   sending the private key to the reprogramming device, wherein the private keys are converted by the respective devices and compared to determine the reprogramming authorization response.

7. The computer readable medium of claim 6, wherein the authorization response denies reprogramming.

8. The computer readable medium of claim 6, wherein the authorization response allows reprogramming.

9. The computer readable medium of claim 6, wherein the authorization response allows partial reprogramming.

10. The computer readable medium of claim 6, further comprising instructions for performing the steps of:
    storing the authorization request and the authorization response in the data storage area; and
    associating the authorization request and the authorization response with the requesting reprogrammable wireless communication device.

11. A system for improved security in reprogramming wireless communication devices, the system comprising:
    a reprogrammable wireless communication device having a serial interface adaptable for communication with a reprogramming device; and
    a security server communicatively coupled with the reprogrammable wireless communication device over a wireless communication network; and
    a data storage area coupled with the security server, the data storage area configured to store information related to the reprogramming of reprogrammable wireless communication devices, the reprogrammable wireless communication device further comprising an access flap modifiable by the security server, wherein the access flap is set for one of the following:
    to allow the handset to authorize reprogramming,
    to require the security server to authorize handset reprogramming, and
    to allow reprogramming without authorization,
    wherein the reprogrammable wireless communication device in response to a communication from the reprogramming device, contacts the security server for authorization to be reprogrammed by the reprogramming device, the reprogramming authorization request generated by the reprogrammable wireless communication device and the reprogramming authorization based on a calculation.

12. The system of claim 11, wherein the reprogrammable wireless communication device comprises an access code, the access code providing authorization to reprogram the reprogrammable wireless communication device.

13. The system of claim 12, wherein the reprogrammable wireless communication device is configured to deny reprogramming when the authorization code is not provided.

14. A method for providing variable reprogramming access to a reprogrammable wireless communication device, the method comprising the steps of:
compiling a remote opcode set comprising at least one remote opcode and a data payload; and
sending the remote opcode set to a plurality of handsets, wherein processing of the remote opcode set causes each handset to modify its level of reprogramming security wherein the modification comprises turning off reprogramming security for a discrete time interval.

15. The method of claim 14, wherein the modification comprises allowing the handset to authorize handset reprogramming.

16. The method of claim 14, wherein the modification comprises requiring a security server to authorize handset reprogramming.

17. A method for improved security in reprogramming wireless communication devices, the method comprising the steps of:
receiving an authorization request generated by a reprogrammable wireless communication device in communication with a reprogramming device, the authorization request comprising contact information for the reprogramming device, requesting authorization to be reprogrammed by the reprogramming device and having a unique identifier for the requesting reprogrammable wireless communication device;
consulting a data storage area for reprogramming information pertaining to the reprogrammable wireless communication device, the reprogramming information comprising the current programming status of the reprogrammable wireless communication device;
sending a reprogramming authorization response to the reprogrammable wireless communication device based on the current programming status, wherein the reprogramming authorization response comprises a security key;
sending the security key to the reprogramming device, wherein the security keys are processed by the respective devices and compared to determine that reprogramming is authorized;
storing the authorization request and the authorization response in the data storage area; and
associating the authorization request and the authorization response with the requesting reprogrammable wireless communication device.

18. A method for improved security in reprogramming wireless communication devices, the method comprising the steps of:
receiving an authorization request generated by a reprogrammable wireless communication device in communication with a reprogramming device, the authorization request comprising contact information for the reprogramming device, requesting authorization to be reprogrammed by the reprogramming device and having a unique identifier for the requesting reprogrammable wireless communication device;
consulting a data storage area for reprogramming information pertaining to the reprogrammable wireless communication device, the reprogramming information comprising the current programming status of the reprogrammable wireless communication device;
sending a reprogramming authorization response to the reprogrammable wireless communication device based on the current programming status, wherein the reprogramming authorization response comprises a security key;
sending the security key to the reprogramming device, wherein the security keys are processed by the respective devices and compared to determine that partial reprogramming is authorized;
storing the authorization request and the authorization response in the data storage area; and
associating the authorization request and the authorization response with the requesting reprogrammable wireless communication device.

19. A method for improved security in reprogramming wireless communication devices, the method comprising the steps of:
receiving an authorization request generated by a reprogrammable wireless communication device in communication with a reprogramming device, the authorization request comprising contact information for the reprogramming device, requesting authorization to be reprogrammed by the reprogramming device and having a unique identifier for the requesting reprogrammable wireless communication device;
consulting a data storage area for reprogramming information pertaining to the reprogrammable wireless communication device, the reprogramming information comprising the current programming status of the reprogrammable wireless communication device;
sending a reprogramming authorization response to the reprogrammable wireless communication device based on the current programming status, wherein the reprogramming authorization response comprises a security key;
sending the security key to the reprogramming device, wherein the security keys are processed by the respective devices and compared to determine that reprogramming is denied;
storing the authorization request and the authorization response in the data storage area; and
associating the authorization request and the authorization response with the requesting reprogrammable wireless communication device.

* * * * *

UNITED STATES PATENT AND TRADEMARK OFFICE
CERTIFICATE OF CORRECTION

PATENT NO. : 7,254,386 B2  Page 1 of 1
APPLICATION NO. : 10/206780
DATED : August 7, 2007
INVENTOR(S) : Gowri Rajaram It is certified that error appears in the above-identified patent and that said Letters Patent is hereby corrected as shown below:

Claim 6, Column 28, line 20
should read:

--and where the reprogramming authorization response is based on a calculation;--

Claim 11, Column 28, line 44
should read:

--a serial interface adaptable for communication with a reprogramming device;--

Signed and Sealed this

Twenty-seventh Day of May, 2008

JON W. DUDAS
*Director of the United States Patent and Trademark Office*